United States Patent
Muruganathan et al.

(10) Patent No.: US 12,425,161 B2
(45) Date of Patent: Sep. 23, 2025

(54) INDICATION OF TCI STATES FOR APERIODIC CSI-RS WITH LOW CONFIGURATION OVERHEAD

(71) Applicant: Telefonaktiebolaget LM Ericsson (publ), Stockholm (SE)

(72) Inventors: Siva Muruganathan, Stittsville (CA); Shiwei Gao, Nepean (CA); Magnus Hurd, Stockholm (SE); Andreas Nilsson, Gothenburg (SE); Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 390 days.

(21) Appl. No.: 18/018,953

(22) PCT Filed: Jul. 30, 2021

(86) PCT No.: PCT/IB2021/056997
§ 371 (c)(1),
(2) Date: Jan. 31, 2023

(87) PCT Pub. No.: WO2022/024079
PCT Pub. Date: Feb. 3, 2022

(65) Prior Publication Data
US 2023/0299916 A1    Sep. 21, 2023

Related U.S. Application Data

(60) Provisional application No. 63/059,719, filed on Jul. 31, 2020.

(51) Int. Cl.
*H04L 5/00* (2006.01)
*H04B 7/06* (2006.01)

(52) U.S. Cl.
CPC ....... *H04L 5/0051* (2013.01); *H04B 7/06968* (2023.05); *H04L 5/0053* (2013.01); *H04L 5/0091* (2013.01)

(58) Field of Classification Search
None
See application file for complete search history.

(56) References Cited

U.S. PATENT DOCUMENTS

2018/0219606 A1 * 8/2018 Ng ............... H04W 72/0453
2019/0069285 A1 * 2/2019 Chandrasekhar ..... H04W 72/23
(Continued)

FOREIGN PATENT DOCUMENTS

CN    113316253 A    8/2021
WO    2021165767 A1    8/2021
(Continued)

OTHER PUBLICATIONS

Author Unknown, "Technical Specification Group Radio Access Network; NR; Physical layer procedures for data (Release 16)," Technical Specification 38.214, Version 16.2.0, Jun. 2020, 3GPP Organizational Partners, 163 pages.
(Continued)

*Primary Examiner* — Phirin Sam
(74) *Attorney, Agent, or Firm* — Withrow & Terranova, PLLC

(57) ABSTRACT

Indication of Transmission Configuration Indication (TCI) states for aperiodic Channel State Information-Reference Signal (CSI-RS) with low configuration overhead is provided. More specifically, methods performed by a wireless device(s) and a base station(s) for indicating a configuration parameter(s) for triggering aperiodic CSI-RS are provided. The methods disclosed herein make it possible for triggering aperiodic CSI-RS with multiple options (e.g., any of indicated TCI states and/or Quasi Co-Located relationships). As
(Continued)

a result, it is possible to significantly reduce configuration overhead related to indicating aperiodic CSI-RS.

15 Claims, 21 Drawing Sheets

(56) References Cited

U.S. PATENT DOCUMENTS

| | | | |
|---|---|---|---|
| 2020/0367208 A1 | 11/2020 | Khoshnevisan et al. | |
| 2021/0028843 A1* | 1/2021 | Zhou | H04L 5/0053 |
| 2021/0226688 A1* | 7/2021 | Khoshnevisan ... | H04B 7/06964 |
| 2022/0210818 A1* | 6/2022 | Cirik | H04W 72/232 |
| 2022/0417775 A1* | 12/2022 | Cirik | H04B 7/0695 |
| 2023/0379951 A1* | 11/2023 | Khoshnevisan .. | H04W 72/0453 |
| 2024/0137960 A1* | 4/2024 | Park | H04L 5/0091 |

FOREIGN PATENT DOCUMENTS

| | | |
|---|---|---|
| WO | 2021169904 A1 | 9/2021 |
| WO | 2023031806 A1 | 3/2023 |

OTHER PUBLICATIONS

Author Unknown, "Technical Specification Group Radio Access Network; NR; User Equipment (UE) radio access capabilities (Release 16)," Technical Specification 38.306, Version 16.1.0, Jul. 2020, 3GPP Organizational Partners, 106 pages.
Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.
Ericsson, "R1-1909225: Enhancements to multibeam operation," 3GPP TSG-RAN WG1 Meeting #98, Aug. 26-30, 2019, Prague, Czech Republic, 24 pages.
Mediatek Inc., "R1-2003660: R16 maintenance of multi-TRP operation," 3GPP TSG RAN WG1 Meeting #101-e, May 25-29, 2020, Electronic Meeting, 11 pages.
Vivo, "R1-2001690: Remaining issues on aperiodic CSI-RS triggering," 3GPP TSG RAN WG1 #100bis, Apr. 20-30, 2020, Electronic Meeting, 6 pages.
International Search Report and Written Opinion for International Patent Application No. PCT/IB2021/056997, mailed Oct. 12, 2021, 15 pages.
Author Unknown, "Technical Specification Group Radio Access Network; NR; Multiplexing and channel coding (Release 16)," Technical Specification 38.212, Version 16.2.0, Jun. 2020, 3GPP Organizational Partners, 151 pages.
Author Unknown, "Technical Specification Group Radio Access Network; NR; Medium Access Control (MAC) protocol specification (Release 16)," Technical Specification 38.321, Version 16.1.0, Jul. 2020, 3GPP Organizational Partners, 151 pages.
Vivo, "R1-1900137: Discussion on multi PDCCH based multi TRP transmission," 3GPP TSG RAN WG1 Ad-Hoc Meeting 1901, Taipei, Taiwan, Jan. 21-25, 2019, 15 pages.
Xiaomi, "R1-2111540: Enhancements on multi-beam operation," 3GPP TSG RAN WG1 #107-e, Nov. 11-19, 2021, Electronic Meeting, 7 pages.
Invitation to Pay Additional Fees and Partial Search for International Patent Application No. PCT/IB2023/052090, mailed Jun. 20, 2023, 26 pages.
International Search Report and Written Opinion for International Patent Application No. PCT/IB2023/052090, mailed Aug. 11, 2023, 26 pages.
Samsung, "R1-2102112: Moderator summary#6 for multi-beam enhancement: Round 3B," 3GPP TSG RAN WG1 #104-e, Jan. 25-Feb. 5, 2021, Electronic Meeting, 43 pages.
International Search Report and Written Opinion for International Patent Application No. PCT/IB2022/058139, mailed Jan. 3, 2023, 12 pages.

* cited by examiner

CSI-AperiodicTriggerStateList information element

```
-- ASN1START
-- TAG-CSI-APERIODICTRIGGERSTATELIST-START

CSI-AperiodicTriggerStateList ::=   SEQUENCE (SIZE (1..maxNrOfCSI-AperiodicTriggers)) OF CSI-
AperiodicTriggerState CSI-AperiodicTriggerState ::=   SEQUENCE {
    associatedReportConfigInfoList   SEQUENCE (SIZE(1..maxNrofReportConfigPerAperiodicTrigger)) OF CSI-
AssociatedReportConfigInfo,
    ...
}

CSI-AssociatedReportConfigInfo ::= SEQUENCE {
    reportConfigId              CSI-ReportConfigId,
    resourcesForChannel         CHOICE {
        nzp-CSI-RS              SEQUENCE {
            resourceSet         INTEGER (1..maxNrofNZP-CSI-RS-ResourceSetsPerConfig),
            qcl-info            SEQUENCE (SIZE(1..maxNrofAP-CSI-RS-ResourcesPerSet)) OF
TCI-StateId                                                                            OPTIONAL   -- Cond
Aperiodic
        },
        csi-SSB-ResourceSet     INTEGER (1..maxNrofCSI-SSB-ResourceSetsPerConfig)
    },
    csi-IM-ResourcesForInterference INTEGER(1..maxNrofCSI-IM-ResourceSetsPerConfig)     OPTIONAL,  -- Cond
CSI-IM-ForInterference
    nzp-CSI-RS-ResourcesForInterference INTEGER (1..maxNrofNZP-CSI-RS-ResourceSetsPerConfig)
                                                                                        OPTIONAL,  -- Cond
NZP-CSI-RS-ForInterference
    ...
}

-- TAG-CSI-APERIODICTRIGGERSTATELIST-STOP
-- ASN1STOP
```

*FIG. 5*

```
              CSI-AperiodicTriggerStateList information element

-- ASN1START
-- TAG-CSI-APERIODICTRIGGERSTATELIST-START

CSI-AperiodicTriggerStateList ::=     SEQUENCE (SIZE (1..maxNrOfCSI-AperiodicTriggers)) OF CSI-
AperiodicTriggerState CSI-AperiodicTriggerState ::=    SEQUENCE {
     associatedReportConfigInfoList        SEQUENCE
(SIZE(1..maxNrOfReportConfigPerAperiodicTrigger)) OF CSI-AssociatedReportConfigInfo,
     ...
}

CSI-AssociatedReportConfigInfo ::=  SEQUENCE {
     reportConfigId                CSI-ReportConfigId,
     resourcesForChannel           CHOICE {
          nzp-CSI-RS                   SEQUENCE {
               resourceSet                      INTEGER (1..maxNrOfNZP-CSI-RS-
ResourceSetsPerConfig),
               followControlResourceSetTCIstate   ENUMERATED {enabled}      OPTIONAL,  --
Cond Aperiodic
               qcl-info                          SEQUENCE (SIZE(1..maxNrOfAP-CSI-RS-
ResourcesPerSet)) OF TCI-StateId                                            OPTIONAL
     -- Cond Aperiodic
          },
          csi-SSB-ResourceSet          INTEGER (1..maxNrOfCSI-SSB-ResourceSetsPerConfig)
     },
     csi-IM-ResourcesForInterference      INTEGER(1..maxNrOfCSI-IM-ResourceSetsPerConfig)
                                                                            OPTIONAL,
     -- Cond CSI-IM-ForInterference
     nzp-CSI-RS-ResourcesForInterference  INTEGER (1..maxNrOfNZP-CSI-RS-ResourceSetsPerConfig)
                                                                            OPTIONAL,
     -- Cond NZP-CSI-RS-ForInterference
     ...
}

-- TAG-CSI-APERIODICTRIGGERSTATELIST-STOP
-- ASN1STOP
```

*FIG. 11*

CSI-AperiodicTriggerStateList information element

```
-- ASN1START
-- TAG-CSI-APERIODICTRIGGERSTATELIST-START

CSI-AperiodicTriggerStateList ::=     SEQUENCE (SIZE (1..maxNrofCSI-AperiodicTriggers)) OF CSI-
AperiodicTriggerState CSI-AperiodicTriggerState ::=     SEQUENCE {
    associatedReportConfigInfoList       SEQUENCE (SIZE(1..maxNrofReportConfigPerAperiodicTrigger)) OF
CSI-AssociatedReportConfigInfo,
...
}

CSI-AssociatedReportConfigInfo ::= SEQUENCE {
    reportConfigId                  CSI-ReportConfigId,
    resourcesForChannel             CHOICE {
        nzp-CSI-RS                  SEQUENCE {
            resourceSet             INTEGER (1..maxNrofNZP-CSI-RS-ResourceSetsPerConfig),
            followControlResourceSetTCIState    SEQUENCE (SIZE(1..maxNrofAP-CSI-RS-ResourcesPerSet)) OF
BOOLEAN
                                    OPTIONAL,  -- Cond Aperiodic
            SEQUENCE (SIZE(1..maxNrofAP-CSI-RS-ResourcesPerSet)) OF
TCI-StateId     qcl-info                                OPTIONAL   -- Cond
Aperiodic
        },
        csi-SSB-ResourceSet         INTEGER (1..maxNrofCSI-SSB-ResourceSetsPerConfig)
    },
    csi-IM-ResourcesForInterference INTEGER(1..maxNrofCSI-IM-ResourceSetsPerConfig)
                                                        OPTIONAL,  -- Cond CSI-IM-
ForInterference
    nzp-CSI-RS-ResourcesForInterference INTEGER (1..maxNrofNZP-CSI-RS-ResourceSetsPerConfig)
                                                        OPTIONAL,  -- Cond NZP-
CSI-RS-ForInterference
    ...
}

-- TAG-CSI-APERIODICTRIGGERSTATELIST-STOP
-- ASN1STOP
```

*FIG. 13*

*CSI-AperiodicTriggerStateList information element*

```
-- ASN1START
-- TAG-CSI-APERIODICTRIGGERSTATELIST-START

CSI-AperiodicTriggerStateList ::=    SEQUENCE (SIZE (1..maxNrofCSI-AperiodicTriggers)) OF
CSI-AperiodicTriggerState CSI-AperiodicTriggerState ::=    SEQUENCE {
    associatedReportConfigInfoList    SEQUENCE
(SIZE(1..maxNrofReportConfigPerAperiodicTrigger)) OF CSI-AssociatedReportConfigInfo,
    ...
}

CSI-AssociatedReportConfigInfo ::= SEQUENCE {
    reportConfigId          CSI-ReportConfigId,
    resourcesForChannel     CHOICE {
        nzp-CSI-RS              SEQUENCE {
            resourceSet             INTEGER (1..maxNrofNZP-CSI-RS-
ResourceSetsPerConfig),
            followTciInDCI          ENUMERATED {enabled}                    OPTIONAL,  --
Cond Aperiodic
            qcl-info                SEQUENCE (SIZE(1..maxNrofAP-CSI-RS-
ResourcesPerSet)) OF TCI-StateId
        },
        csi-SSB-ResourceSet     INTEGER (1..maxNrofCSI-SSB-
ResourceSetsPerConfig)
    },
    csi-IM-ResourcesForInterference    INTEGER(1..maxNrofCSI-IM-ResourceSetsPerConfig)
OPTIONAL, -- Cond CSI-IM-ForInterference
    nzp-CSI-RS-ResourcesForInterference INTEGER (1..maxNrofNZP-CSI-RS-ResourceSetsPerConfig)
OPTIONAL, -- Cond NZP-CSI-RS-ForInterference
    ...
}

-- TAG-CSI-APERIODICTRIGGERSTATELIST-STOP
-- ASN1STOP
```

FIG. 14

CSI-AperiodicTriggerStateList information element

```
-- ASN1START
-- TAG-CSI-APERIODICTRIGGERSTATELIST-START

CSI-AperiodicTriggerStateList ::=   SEQUENCE (SIZE (1..maxNrofCSI-AperiodicTriggers)) OF CSI-
AperiodicTriggerState CSI-AperiodicTriggerState ::=   SEQUENCE {
    associatedReportConfigInfoList  SEQUENCE
(SIZE(1..maxNrofReportConfigPerAperiodicTrigger)) OF CSI-AssociatedReportConfigInfo,
    ...
}

CSI-AssociatedReportConfigInfo ::= SEQUENCE {
    reportConfigId          CSI-ReportConfigId,
    resourcesForChannel     CHOICE {
        nzp-CSI-RS              SEQUENCE {
            resourceSet             INTEGER (1..maxNrofNZP-CSI-RS-
ResourceSetsPerConfig),
            followTciInDCI          SEQUENCE (SIZE(1..maxNrofAP-CSI-RS-ResourcesPerSet)) OF BOOLEAN
                OPTIONAL,  -- Cond Aperiodic
            qcl-info                SEQUENCE (SIZE(1..maxNrofAP-CSI-RS-
ResourcesPerSet)) OF TCI-StateId                                                     OPTIONAL   --
Cond Aperiodic
        },
        csi-SSB-ResourceSet     INTEGER (1..maxNrofCSI-SSB-ResourceSetsPerConfig)
    },
    csi-IM-ResourcesForInterference INTEGER(1..maxNrofCSI-IM-ResourceSetsPerConfig)
                                                                        OPTIONAL,  -- Cond
CSI-IM-ForInterference
    nzp-CSI-RS-ResourcesForInterference INTEGER (1..maxNrofNZP-CSI-RS-ResourceSetsPerConfig)
                                                                        OPTIONAL,  --
Cond NZP-CSI-RS-ForInterference
    ...
}

-- TAG-CSI-APERIODICTRIGGERSTATELIST-STOP
-- ASN1STOP
```

FIG. 15

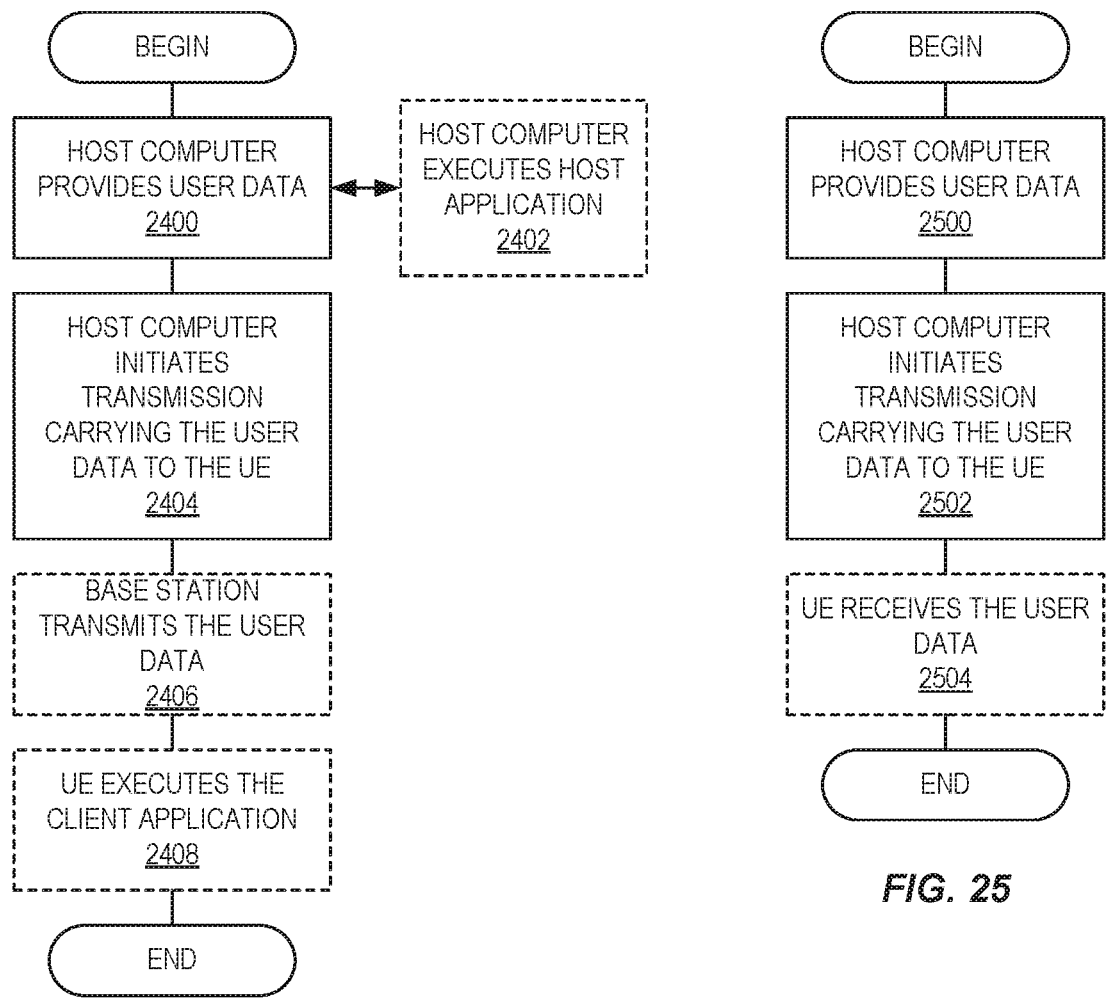

INDICATION OF TCI STATES FOR APERIODIC CSI-RS WITH LOW CONFIGURATION OVERHEAD

RELATED APPLICATIONS

This application is a 35 U.S.C. § 371 national phase filing of International Application No. PCT/IB2021/056997, filed Jul. 30, 2021, which claims the benefit of provisional patent application Ser. No. 63/059,719, filed Jul. 31, 2020, the disclosures of which are hereby incorporated herein by reference in their entireties.

TECHNICAL FIELD

The technology of the disclosure relates generally to signaling for scheduling aperiodic Channel State Information-Reference Signal (CSI-RS).

BACKGROUND

New Radio (NR) Frame Structure and Resource Grid

NR uses Cyclic Prefix (CP)-Orthogonal Frequency Division Multiplexing (OFDM) (CP-OFDM) in both downlink (DL) (i.e., from a network node, gNB, or base station, to a user equipment or UE) and uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f=15$ kHz, there is only one slot per subframe, and each slot consists of 14 OFDM symbols.

Data scheduling in NR is typically on slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15 \times 2^\mu)$ kHz where $\mu \in \{0,1,2,3,4\}$. $\Delta f=15$ kHz is the basic subcarrier spacing. The slot duration at different subcarrier spacings is given by $\frac{1}{2^\mu}$ ms.

In the frequency domain, a system bandwidth is divided into Resource Blocks (RBs), each corresponding to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs and OFDM symbols in the current downlink slot the data is transmitted on. PDCCH is typically transmitted in the first few OFDM symbols in each slot in NR. The UE data are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not connected to the network while DCI format 1_1 can be used for scheduling Multiple-Input-Multiple-Output (MIMO) transmissions with up to 2 Transport Blocks (TBs). DCI format 1_2 is introduced in NR Release 16 (Rel-16) to support configurable size for certain bit fields in the DCI.

In NR, uplink data transmission can be dynamically scheduled using PDCCH. A UE first decodes uplink grants in PDCCH and then transmits data over PUSCH based the decoded control information in the uplink grant such as modulation order, coding rate, uplink resource allocation, etc. In dynamic scheduling of PUSCH, there is also a possibility to configure semi-persistent transmission of PUSCH using Configured Grants (CG). There are two types of CG based PUSCH defined in NR. In CG type 1, a periodicity of PUSCH transmission as well as the time domain offset are configured by Radio Resource Control (RRC). In CG type 2, a periodicity of PUSCH transmission is configured by RRC and then the activation and release of such transmission is controlled by DCI, i.e., with a PDCCH. Similar to the downlink, there are three DCI formats defined for scheduling PUSCH in NR, i.e., DCI format 0_0, DCI format 0_1, and DCI format 0_2.

Transmission Configuration Indication (TCI) States

Demodulation Reference Signals (DM-RS) are used for coherent demodulation of PDSCH. The DM-RS is confined to RBs carrying the associated PDSCH and is mapped on allocated REs of the OFDM time-frequency grid in NR such that the receiver can efficiently handle time/frequency-selective fading radio channels. A PDSCH can have one or multiple DM-RS, each associated with an antenna port. The antenna ports used for PDSCH are indicated in DCI scheduling the PDSCH.

Several signals can be transmitted from different antenna ports in a same location. These signals can have the same large-scale properties, for instance in terms of Doppler shift/spread, average delay spread, or average delay, when measured at the receiver. These antenna ports are then said to be Quasi Co-Located (QCL).

The network can then signal to the UE that two antenna ports are QCL. If the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (known as source RS) and the second antenna port is a DM-RS (known as target RS).

For instance, if antenna ports A and B are QCL with respect to average delay, the UE can estimate the average delay from the signal received from antenna port A (known as the source RS) and assume that the signal received from antenna port B (target RS) has the same average delay. This is useful for demodulation since the UE can know beforehand the properties of the channel when trying to measure the channel utilizing the DM-RS.

Information about what assumptions can be made regarding QCL is signaled to the UE from the network. In NR, four types of QCL relations between a transmitted source RS and transmitted target RS were defined:
Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them. Note that for beam management, the discussion mostly revolves around QCL Type D, but it is also necessary to convey a Type A QCL relation for the RSs to the UE, so that it can estimate all the relevant large-scale parameters.

Typically, this is achieved by configuring the UE with a CSI-RS for tracking (TRS) for time/frequency offset estimation. To be able to use any QCL reference, the UE would have to receive it with a sufficiently good Signal to Interference and Noise Ratio (SINR). In many cases, this means that the TRS has to be transmitted in a suitable beam to a certain UE.

In NR, a QCL relationship between a DM-RS in PDSCH and other reference signals is described by a TCI state. A UE can be configured through RRC signaling with up to 128 TCI states in Frequency Range 2 (FR2) and up to 8 TCI states in FR1, depending on UE capability. Each TCI state contains QCL information, for the purpose of PDSCH reception. A UE can be dynamically signaled one or two TCI states in the TCI field in a DCI scheduling a PDSCH.

Each TCI state contains QCL information, i.e., one or two source DL RSs, each source RS associated with a QCL type. For example, a TCI state contains a pair of reference signals, each associated with a QCL type, for example two different CSI-RSs {CSI-RS1, CSI-RS2} is configured in the TCI state as {qcl-Type1, qcl-Type2}={Type A, Type D}. It means the UE can derive Doppler shift, Doppler spread, average delay, delay spread from CSI-RS1 and Spatial Rx parameter (i.e., the RX beam to use) from CSI-RS2. In case type D (spatial information) is not applicable, such as low or midband operation, then a TCI state contains only a single source RS.

A QCL relationship between a DM-RS in PDCCH and other reference signals is described by a TCI state of a Control Resource Set (CORESET) over which the PDCCH is transmitted. For each CORESET configured to a UE, a list of TCI states is RRC configured, one of them is activated by a MAC CE. In NR Rel-15, up to 3 CORESETs per Bandwidth Part (BWP) can be configured for a UE. In NR Rel-16, up to 5 CORESETs per BWP may be configured to a UE, depending on capability.

PDSCH Transmission Over Multiple Transmission Points or Panels

A PDSCH may be transmitted to a UE from multiple Transmission-Reception Points (TRPs). Since different TRPs may be located in different physical locations and/or may be transmitting with different beams, the propagation channels between the UE and the different TRPs can be different. To facilitate receiving PDSCH data from different TRPs or beams, a UE may be indicated with two TCI states, each associated with a TRP or a beam, by a single codepoint of a TCI field in a DCI.

One example of PDSCH transmission over two TRPs using a single DCI is shown in FIG. 3, where different layers of a PDSCH within a single codeword (CW) are sent over two TRPs, each associated with a different TCI state. In this case, two DM-RS ports, one for each layer, in two CDM groups are also signaled to the UE. A first TCI state is associated with the DM-RS port in a first CDM group, and a second TCI state is associated with the DM-RS port in a second CDM group. This approach was referred to as Non-Coherent Joint Transmission (NC-JT) or scheme 1a in NR Rel-16 3GPP discussions.

Default TCI State(s)

In NR, if the scheduling offset between the reception of a DL DCI and the corresponding PDSCH is less than a higher layer configured threshold timeDurationForQCL, then default TCI state(s) is/are used to receive the PDSCH. A default TCI state provides a receive (Rx) beam to be used by the UE to receive (and buffer) a PDSCH before the corresponding DCI is decoded (i.e., when the scheduling offset is less than the threshold timeDurationForQCL). Before DCI decoding, UE does not know what TCI state(s) is/are needed the receive the PDSCH. In the case that the scheduling offset is lower than the threshold timeDurationForQCL, there may not be enough time for the UE to decode the DCI and then receive the PDSCH with the TCI state indicated in the TCI field in DCI. Therefore, the UE uses the Rx beam provided in the default TCI state to receive the PDSCH.

The Rx beam is provided as a reference signal with QCL Type D in the default TCI state. If none of configured TCI states for the serving cell of scheduled PDSCH contains QCL Type D, the UE shall obtain the other QCL assumptions from the TCI states indicated by DCI for its scheduled PDSCH irrespective of the scheduling offset between the reception of the DL DCI and the corresponding PDSCH. That is, the default TCI state is only applicable if at least one of the TCI states configured for the serving cell of the scheduled PDSCH contains 'QCL-TypeD'.

Rel-15 Default TCI State Definition

In NR Rel-15, the default TCI state is defined in the following way, which is intended to target single TRP or single panel deployments:
If the scheduling offset between the reception of a DL DCI and the corresponding PDSCH is less than the threshold timeDurationForQCL, the UE may assume that the TCI state for the PDSCH is given by the TCI state activated for the CORESET (i.e., ControlResourceSet) with the lowest ControlResourceSetId among one or more CORESETs in the latest slot in an active BWP of a serving cell monitored by the UE. That is, the UE does not use the TCI state indicated in the TCI field in DCI scheduling a PDSCH given that the scheduling offset is less than timeDurationForQCL.

Rel-16 Default TCI State Definition

In NR Rel-16, two additional default TCI state definitions are defined targeting multi-TRP or multi-panel deployments, which are briefly described below:
If the UE is configured with higher layer parameter enableTwoDefaultTCIStates and the scheduling offset between the reception of the DL DCI and the corresponding PDSCH is less than the threshold timeDurationForQCL, and at least one TCI codepoint is configured with two TCI states, the UE may assume that the TCI states for the PDSCH are given by the TCI states corresponding to the lowest codepoint among the TCI codepoints containing two different TCI states. In this case, the two TCI states corresponding to the lowest codepoint among the TCI codepoints containing two different TCI states are the default TCI states.
If a UE is configured with enableDefaultTCIStatePer-CoresetPoolIndex via higher layers and the UE is configured by higher layer parameter PDCCH-Config that contains two different values of CORESETPoolIndex in CORESETs, then one default TCI state is defined per CORESETPoolIndex. Assume that a PDSCH is scheduled via a PDCCH carried in a CORESET belonging to a given CORESETPoolIndex. If the scheduling offset between the reception of the DL DCI and the corresponding PDSCH is less than the threshold timeDurationForQCL, the UE may assume that the TCI state for the PDSCH is given by the TCI state activated for the CORESET with the lowest ControlResourceSetId among one or more CORESETs belonging to the given CORESETPoolIndex in the latest slot in an active BWP of a serving cell monitored by the UE.

TCI States for Uplink

In NR Rel-15, the handling of spatial transmission properties is different for PUSCH, PUCCH, and SRS. For PUCCH, the spatial relation information is defined in information element PUCCH-SpatialRelationInfo, and the spatial relation information for SRS is configured as part of SRS resource configuration. The spatial transmission properties for PUSCH are given by the spatial transmission properties associated with the SRS(s) configured in SRS resource set with usage of 'Codebook' or 'non-Codebook'. It has been argued that the Rel-15 way of handling the spatial transmission properties is cumbersome and inflexible when it comes to uplink multi-panel transmission in NR. Hence, TCI states for uplink are proposed that can be used to control the spatial properties of all the UL transmissions (i.e., PUSCH, PUCCH, and SRS). The focus was to be able to use uplink TCI state indication to select one of the uplink panels and the corresponding transmission beam (i.e., transmission properties) at the UE to transmit UL PUSCH/PUCCH/SRS when the UE is equipped with multiple panels.

In general, TCI states for uplink are configured by higher layers (i.e., RRC) for a UE. There are multiple ways of configuring uplink TCI state.

In one case, the UL TCI states are dedicated to only uplink and are configured separately from the TCI states corresponding to downlink. For example, the UL TCI states can be configured as part of the PUSCH-Config information element. Each uplink TCI state may indicate a transmission configuration which contains a DL RS (e.g., Non-Zero Power (NZP) CSI-RS or Synchronization Signal Block (SSB)) or an UL RS (e.g., SRS) with the purpose of indicating a spatial relation for PUSCH DMRS. Alternatively, the UL TCI states may be configured as part of BWP-UplinkDedicated information element such that the same UL TCI state can be used to indicate a DL RS or UL RS which provides the spatial relation for more than one of PUSCH DMRS, PUCCH DMRS, and SRS.

In another case, the same list of TCI states is used for DL and UL, hence the UE is configured with a single list of TCI states which can be used for both UL and DL scheduling. The single list of TCI states in this case are configured as part of for example the PDSCH-Config or the BWP-UplinkDedicated information elements.

Channel State Information (CSI)-Reference Signals (CSI-RS)

For CSI measurement and feedback, CSI-RSs are defined in NR. A CSI-RS is transmitted on each antenna port and is used by a UE to measure downlink channel between each of the transmit antenna ports and each receive antennas. The antenna ports are also referred to as CSI-RS ports. The supported number of antenna ports in NR are {1,2,4,8,12, 16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

NZP CSI-RS can be configured to be transmitted in certain REs in a slot and certain slots. FIG. 4 shows an example of CSI-RS REs for 12 antenna ports, where 1RE per RB per port is shown.

In addition, CSI Interference Measurement resource (CSI-IM) is also defined in NR for a UE to measure interference. A CSI-IM resource contains 4 REs, either 4 adjacent RE in frequency in the same OFDM symbol or 2 by 2 adjacent REs in both time and frequency in a slot. By measuring both the channel based on NZP CSI-RS and the interference based on CSI-IM, a UE can estimate the effective channel and noise plus interference to determine the CSI, i.e., rank, precoding matrix, and the channel quality.

In NR, the CSI-RS can be aperiodic CSI-RS, semi-persistent CSI-RS, or periodic CSI-RS.

CSI Framework in NR

In NR, a UE can be configured with multiple CSI reporting settings (each represented by a higher layer parameter CSI-ReportConfig with an associated identity ReportConfigID) and multiple CSI resource settings (each represented by a higher layer parameter CSI-ResourceConfig with an associated identity CSI-ResourceConfigId). Each CSI resource setting can contain multiple CSI resource sets (each represented by a higher layer parameter NZP-CSI-RS-ResourceSet with an associated identity NZP-CSI-RS-ResourceSetId for channel measurement or by a higher layer parameter CSI-IM-ResourceSet with an associated identity CSI-IM-ResourceSetId for interference measurement), and each NZP CSI-RS resource set for channel measurement can contain up to 8 NZP CSI-RS resources. For each CSI reporting setting, a UE feeds back a set of CSI, which may include one or more of a CSI-RS Resource Indicator (CRI), a Rank Indicator (RI), a Precoding Matrix Indicator (PMI) and a Channel Quality Indicator (CQI) per CW, depending on the configured report quantity.

In each CSI reporting setting, it contains at least the following information:
  A CSI resource setting for channel measurement based on NZP CSI-RS resources (represented by a higher layer parameter resourcesForChannelMeasurement)
  A CSI resource setting for interference measurement based on CSI-IM resources (represented by a higher layer parameter csi-IM-ResourcesForInterference)
  Optionally, a CSI resource setting for interference measurement based on NZP CSI-RS resources (represented by a higher layer parameter nzp-CSI-RS-ResourcesForInterference)
  Time-domain behavior, i.e., periodic, semi-persistent, or aperiodic reporting (represented by a higher layer parameter reportConfigType)
  Frequency granularity, i.e., wideband or subband
  CSI parameters to be reported such as RI, PMI, CQI, L1-RSRP/L1_SINR and CRI in case of multiple NZP CSI-RS resources in a resource set is used for channel measurement (represented by a higher layer parameter reportQuantity, such as 'cri-RI-PMI-CQI' 'cri-RSRP', or 'ssb-Index-RSRP')

Codebook types, i.e., type I or II if reported, and codebook subset restriction

Measurement restriction

For periodic and semi-static CSI reporting, only one NZP CSI-RS resource set can be configured for channel measurement and one CSI-IM resource set for interference measurement. For aperiodic CSI reporting, a CSI resource setting for channel measurement can contain more than one NZP CSI-RS resource set for channel measurement. If the CSI resource setting for channel measurement contains multiple NZP CSI-RS resource sets for aperiodic CSI report, only one NZP CSI-RS resource set can be selected and indicated by a UE. For aperiodic CSI reporting, a list of trigger states (given by the higher layer parameters CSI-AperiodicTriggerStateList). As shown in FIG. 5, each CSI-AperiodicTriggerState in CSI-AperiodicTriggerStateList contains a list of associated CSI-ReportConfigs given by CSI-AssociatedReportConfigInfo. Each such CSI-AssociatedReportConfigInfo provides the following:

reportConfigId—ID of the associated CSI report configuration resourceSet—provides resource set containing NZP CSI-RSs for channel measurement.

csi-SSB-ResourceSet—provides resource set containing the SSBs for channel measurement (note that the UE is only provided either resourceSet or csi-SSB-ResourceSet, not both).

qcl-info—a list of reference TCI-States for providing QCL source and QCL type for each NZP CSI-RS in resourceSet for channel measurement. Note that the field qcl-info is mandatory present if the NZP CSI-RS resources in the associated resourceSet are aperiodic. If the CSI-RS resources in the associated resourceSet are not aperiodic, then the qcl-info field is absent.

csi-IM-ResourcesForinterference—provides resource set containing interference measurement resource(s).

nzp-CSI-RS-ResourcesForinterference—provides resource set containing NZP CSI-RSs for interference measurement.

When more than one NZP CSI-RS resources are contained in the selected NZP CSI-RS resource set for channel measurement, a CRI is reported by the UE to indicate to the gNB about the one selected NZP CSI-RS resource in the resource set, together with RI, PMI and CQI associated with the selected NZP CSI-RS resource. This type of CSI assumes that a PDSCH is transmitted from a single TRP and the CSI is also referred to as single TRP CSI.

Existing NR UE Behavior for Receiving Aperiodic CSI-RS

The UE behavior for receiving Aperiodic CSI-RS is specified in NR specifications 3GPP TS 38.214.

If the scheduling offset between the last symbol of the PDCCH carrying the triggering DCI and the first symbol of the aperiodic CSI-RS resources is equal to or greater than the UE reported threshold beamSwitchTiming as defined in [TS 38.306], the UE is expected to apply the QCL assumption in the indicated TCI state(s) for the aperiodic CSI-RS resource(s) in the CSI triggering state indicated by the CSI trigger field in DCI. Note that the indicated TCI state(s) here is provided by the qcl-info in CSI-Associated ReportConfigInfo.

If the scheduling offset between the last symbol of the PDCCH carrying the triggering DCI and the first symbol of the aperiodic CSI-RS resources is less than the UE reported threshold beamSwitchTiming as defined in [TS 38.306], if there is any other downlink signal with an indicated TCI state in the same symbols as the CSI-RS, the UE applies the QCL assumption of the other signal when receiving the aperiodic CSI-RS (i.e., the UE applies the TCI state indicated for the PDSCH DM-RS to also receive the aperiodic CSI-RS).

otherwise, when receiving the aperiodic CSI-RS, the UE applies the QCL assumption (i.e., the TCI state) used for the CORESET associated with a monitored search space with the lowest controlResourceSetId in the latest slot in which one or more CORESETs within the active BWP of the serving cell are monitored.

Note that the other downlink signal above can refer to any of the following:

DM-RS as being part of PDSCH scheduled with offset larger than or equal to the threshold timeDurationForQCL, another aperiodic CSI-RS scheduled with offset larger than or equal to the UE reported threshold beamSwitchTiming, a periodic CSI-RS, or a semi-persistent CSI-RS.

SUMMARY

Embodiments disclosed herein include indication of Transmission Configuration Indication (TCI) states for aperiodic Channel State Information-Reference Signal (CSI-RS) with low configuration overhead. More specifically, methods performed by a wireless device(s) and a base station(s) for indicating a configuration parameter(s) for triggering aperiodic CSI-RS are provided. The methods disclosed herein make it possible for triggering aperiodic CSI-RS with multiple options. As a result, it is possible to significantly reduce configuration overhead related to indicating aperiodic CSI-RS.

In an embodiment, a method performed by a wireless device for receiving aperiodic CSI-RS is provided. The method includes receiving a configuration for receiving the aperiodic CSI-RS and a downlink message in a Control Resource Set, CORESET, wherein the downlink message schedules a transmission of the aperiodic CSI-RS. The method also includes determining a Quasi Co-Located, QCL, relationship between the aperiodic CSI-RS and one or more Downlink Reference Signals, DL RSs, based on the received configuration and one of the received downlink message and the CORESET. The method also includes receiving the aperiodic CSI-RS based on the QCL relationship between the aperiodic CSI-RS and the one or more DL RSs.

In one embodiment, the downlink message is contained in a Downlink Control Information, DCI, carried in a Physical Downlink Control Channel, PDCCH.

In one embodiment, the QCL relationship is related to one or more QCL types each comprising one or more of the following QCL parameters: Doppler shift; Doppler spread; Average delay; Delay spread; and Spatial filter parameter.

In one embodiment, receiving the aperiodic CSI-RS comprises receiving the aperiodic CSI-RS based on QCL parameters of the one or more DL RSs.

In one embodiment, receiving the aperiodic CSI-RS comprises receiving the aperiodic CSI-RS based on the QCL relationship in response to a scheduling offset being greater than or equal to a threshold.

In one embodiment, the scheduling offset corresponds to an offset between a last symbol of the PDCCH and a first symbol of the aperiodic CSI-RS.

In one embodiment, the received configuration indicates one of: a first option comprising an indicator indicating that the QCL relationship is described by a TCI state activated for the CORESET and a second option comprising an indicator indicating that the QCL relationship is described by a TCI state indicated in the downlink message.

In one embodiment, the TCI state comprises one or more QCL types each comprising a respective one of the one or more DL RSs.

In one embodiment, receiving the configuration comprises receiving a higher layer configuration parameter indicating the first option.

In one embodiment, the higher layer configuration parameter is a Radio Resource Control, RRC, parameter.

In one embodiment, the higher layer configuration can be contained in a CSI aperiodic trigger state and is only applicable for aperiodic CSI-RS associated to the aperiodic trigger state.

In one embodiment, the higher layer configuration comprises a followControlResourceSetTCIState parameter configured per one of the following: CSI-AperiodicTriggerState; NZP-CSI-RS-Resource information element; NZP-CSI-RS-ResourceSet information element; CSI-ResourceConfig information element; and ControlResourceSet information element.

In one embodiment, determining the QCL relationship comprises determining a first QCL relationship for receiving a first aperiodic CSI-RS according to a first TCI state activated for a first CORESET and a second QCL relationship for receiving a second aperiodic CSI-RS according to a second TCI state activated for a second CORESET, wherein the downlink message scheduling the first aperiodic CSI-RS and the second aperiodic CSI-RS is received in both the first CORESET and the second CORESET. Receiving the aperiodic CSI-RS comprises receiving the first aperiodic CSI-RS according to the first QCL relationship and the second aperiodic CSI-RS according to the second QCL relationship.

In one embodiment, the first CORESET is identical to or different from the second CORESET.

In one embodiment, the first option can be enabled or disabled per a Non-Zero Power, NZP, CSI-RS resource in an NZP CSI-RS resource set.

In one embodiment, receiving the configuration parameter comprises receiving a higher layer configuration parameter indicating the second option.

In one embodiment, the higher layer configuration parameter is an RRC parameter.

In one embodiment, determining the QCL relationship comprises determining a first QCL relationship for receiving a first aperiodic CSI-RS according to a first TCI state indicated by a single codepoint in the downlink message and a second QCL relationship for receiving a second aperiodic CSI-RS according to a second TCI state indicated by the single codepoint in the downlink message. Receiving the aperiodic CSI-RS comprises receiving the first aperiodic CSI-RS according to the first QCL relationship and the second aperiodic CSI-RS according to the second QCL relationship.

In one embodiment, the second option can be enabled or disabled per an NZP CSI-RS resource in an NZP CSI-RS resource set.

In one embodiment, receiving the configuration comprises receiving a common higher layer configuration parameter indicating the first option or the second option.

In one embodiment, the received configuration is a higher layer configuration parameter that comprises a followTciInDCI parameter in CSI-Associated ReportConfigInfo.

In one embodiment, the higher layer configuration parameter comprises a followTciInDCI parameter configured per one of: CSI-AperiodicTriggerState; NZP-CSI-RS-Resource information element; NZP-CSI-RS-ResourceSet information element; CSI-ResourceConfig information element; and ControlResourceSet information element.

In an embodiment, a wireless device is provided. The wireless device includes processing circuitry configured to cause the wireless device to receive a configuration for receiving the aperiodic CSI-RS and a downlink message in a CORESET, wherein the downlink message schedules a transmission of the aperiodic CSI-RS. The processing circuitry is also configured to cause the wireless device to determine a QCL relationship between the aperiodic CSI-RS and one or more DL RSs based on the received configuration and one of the received downlink message and the CORESET. The processing circuitry is also configured to cause the wireless device to receive the aperiodic CSI-RS based on the QCL relationship between the aperiodic CSI-RS and the one or more DL RSs.

In one embodiment, the processing circuitry is further configured to cause the wireless device to perform any of the steps in any of the claims performed by the wireless device.

In an embodiment, a method performed by a base station for transmitting aperiodic CSI-RS is provided. The method includes transmitting a configuration for receiving the aperiodic CSI-RS and a downlink message in a CORESET, wherein the downlink message schedules a transmission of the aperiodic CSI-RS. The method also includes transmitting the aperiodic CSI-RS based on the configuration and one of the downlink message and the CORESET.

In one embodiment, the downlink message is contained in a DCI carried in a PDCCH.

In one embodiment, transmitting the aperiodic CSI-RS comprises transmitting the aperiodic CSI-RS based on QCL parameters of one or more DL RSs.

In one embodiment, transmitting the aperiodic CSI-RS comprises transmitting the aperiodic CSI-RS based on a QCL relationship in response to a scheduling offset being greater than or equal to a threshold.

In one embodiment, the transmitted configuration indicates one of: a first option comprising an indicator indicating that a QCL relationship between the aperiodic CSI-RS and one or more DL RSs is described by a TCI state activated for the CORESET; and a second option comprising an indicator indicating that the QCL relationship is described by a TCI state indicated in the downlink message.

In one embodiment, the TCI state comprises one or more QCL types each comprising a respective one of the one or more DL RSs.

In one embodiment, transmitting the configuration comprises transmitting a higher layer configuration parameter indicating the first option.

In one embodiment, the higher layer configuration parameter is an RRC parameter.

In one embodiment, the higher layer configuration can be contained in a CSI aperiodic trigger state and is only applicable for aperiodic CSI-RS associated to the aperiodic trigger state.

In one embodiment, the higher layer configuration comprises a followControlResourceSetTCIState parameter configured per one of the following: CSI-AperiodicTriggerState; NZP-CSI-RS-Resource information element; NZP-CSI-RS-ResourceSet information element; CSI-ResourceConfig information element; and ControlResourceSet information element.

In one embodiment, transmitting the aperiodic CSI-RS comprises transmitting a first aperiodic CSI-RS according to a first QCL relationship and a second aperiodic CSI-RS according to a second QCL relationship, wherein: the first QCL relationship is determined according to a first TCI state activated for a first CORESET; the second QCL relationship is determined according to a second TCI state activated for a second CORESET; and the downlink message scheduling the first aperiodic CSI-RS and the second aperiodic CSI-RS is transmitted in both the first CORESET and the second CORESET.

In one embodiment, the first CORESET is identical to or different from the second CORESET.

In one embodiment, the first option can be enabled or disabled per an NZP CSI-RS resource in an NZP CSI-RS resource set.

In one embodiment, transmitting the configuration parameter comprises transmitting a higher layer configuration parameter indicating the second option.

In one embodiment, the higher layer configuration parameter is an RRC parameter.

In one embodiment, transmitting the aperiodic CSI-RS comprises transmitting a first aperiodic CSI-RS according to a first QCL relationship and a second aperiodic CSI-RS according to a second QCL relationship, wherein: the first QCL relationship is determined according to a first TCI state indicated by a single codepoint in the downlink message; and the second QCL relationship is determined according to a second TCI state indicated by the single codepoint in the downlink message.

In one embodiment, the second option can be enabled or disabled per an NZP CSI-RS resource in an NZP CSI-RS resource set.

In one embodiment, transmitting the configuration comprises transmitting a common higher layer configuration parameter indicating the first option or the second option.

In one embodiment, the received configuration is a higher layer configuration parameter that comprises a followTciInDCI parameter in CSI-AssociatedReportConfigInfo.

In one embodiment, the higher layer configuration parameter comprises a followTciInDCI parameter configured per one of: CSI-AperiodicTriggerState; NZP-CSI-RS-Resource information element; NZP-CSI-RS-ResourceSet information element; CSI-ResourceConfig information element; and ControlResourceSet information element.

In an embodiment, a base station is provided. The base station includes processing circuitry configured to cause the base station to transmit a configuration for receiving the aperiodic CSI-RS and a downlink message in a CORESET, wherein the downlink message schedules a transmission of the aperiodic CSI-RS. The processing circuitry is also configured to cause the base station to transmit the aperiodic CSI-RS based on the configuration and the indication.

In one embodiment, the processing circuitry is further configured to cause the base station to perform any of the steps in any of the claims performed by the base station.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5 is an example of CSI-AperiodicTriggerStateList information element;

FIG. 11 shows an example of a higher layer parameter that enables a User Equipment (UE) to receive aperiodic CSI-RS using the TCI state activated for a scheduling Control Resource Set (CORESET);

FIG. 13 shows an example of a CORESET enabled/disabled per Non-Zero Power (NZP) CSI-RS resource in an NZP CSI-RS resource set;

FIG. 14 shows an example of a higher layer parameter configured in the CSI-AssociatedReportConfigInfo;

FIG. 15 shows an example of CSI-AssociatedReportConfigInfo containing an NZP CSI-RS resource set that can have up to maxNrofNZP-CSI-RS-ResourceSetsPerConfig aperiodic NZP CSI-RS resources;

FIG. 24 is a flowchart illustrating a method implemented in a communication system in accordance with one embodiment of the present disclosure; and FIG. 25 is a flowchart illustrating a method implemented in a communication system in accordance with one embodiment of the present disclosure.

DETAILED DESCRIPTION

Figure 1:
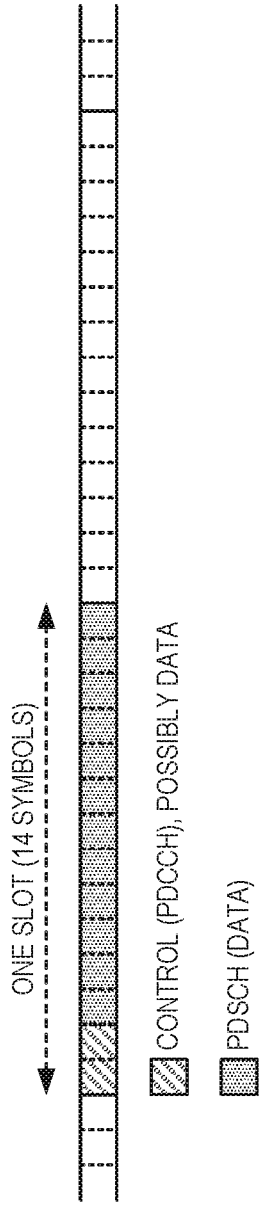
FIG. 1 is a schematic diagram providing an exemplary illustration of data scheduling in New Radio (NR) based on a 14-symbol slot.
Figure 2:
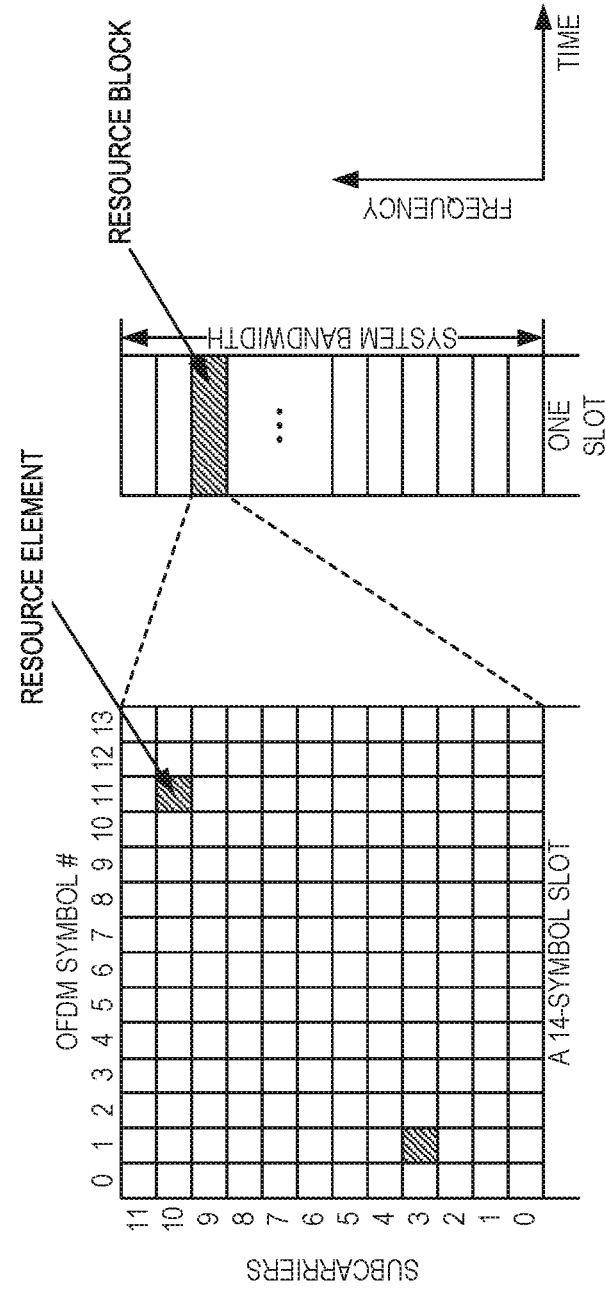
FIG. 2 is a schematic diagram providing an exemplary illustration of a basic NR physical time-frequency resource grid.
Figure 3:
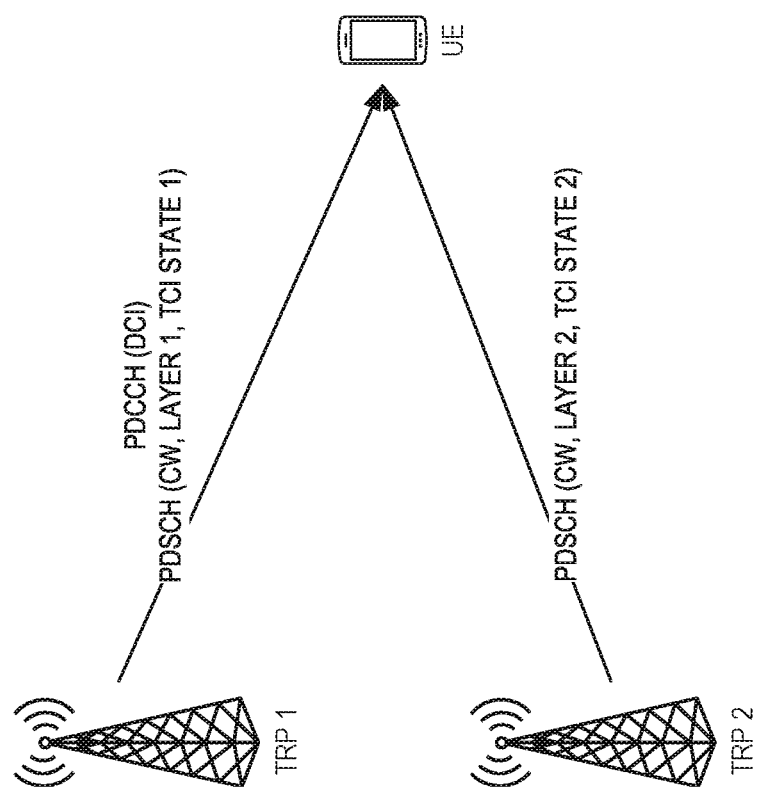
FIG. 3 is a schematic diagram providing an exemplary illustration of Downlink Shared Channel (DSCH) transmission over two Transmission/Reception Points (TRPs) using a single Downlink Control Information (DCI)
Figure 4:
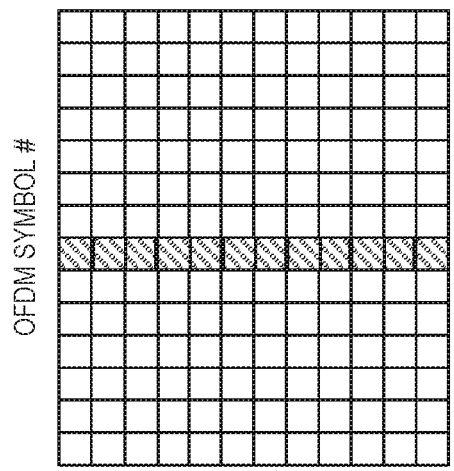
FIG. 4 is a schematic diagram providing an exemplary illustration of Channel State Information-Reference Signal (CSI-RS) Resource Elements (REs) for 12 antenna ports.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist a certain challenge(s). Given a NR UE can be Radio Resource Control (RRC) configured with up to 128 TCI states in Frequency Range 2 (FR2), with the current solution for triggering aperiodic CSI-RS, a large number of CSI-AssociatedReportConfigInfo's may need to be RRC configured to the UE. This is because the qcl-info, which provides the TCI state for the aperiodic CSI-RS, is configured per CSI-AssociatedReportConfigInfo. To be able to trigger Aperiodic CSI-RS with Quasi Co-Located (QCL) information given by any one of up to 128 TCI states, one would require a large number of CSI-AssociatedReportConfigInfo's to be preconfigured (via RRC) to the UE. In addition, a large number of CSI-AssociatedReportConfigInfo will also increase the number of CSI-AperiodicTriggerStates that need to be RRC configured to the UE. Configuring such large number of CSI-AssociatedReportConfigInfos and CSI-AperiodicTriggerStates amounts to large signaling overhead. Hence, how to reduce the configuration overhead for the use case that requires triggering of aperiodic CSI-RS in FR2 is an open problem that needs to be solved.

Certain aspects of the present disclosure and their embodiments may provide solutions to the aforementioned or other challenges. In this disclosure, two different types of solutions are proposed. Both solutions involve configuring the UE via higher layers to follow a given TCI state for receiving aperiodic CSI-RS:

In Solution 1, the given TCI state is the TCI state applied for the Control Resource Set (CORESET) used for the PDCCH transmission that triggered the aperiodic CSI-RS In Solution 2, the given TCI state is the TCI state indicated in uplink related DCI that triggered the aperiodic CSI-RS Various options for configuring the higher layer parameters are proposed. In addition, the above solutions are also extended to be used in scenarios involving multi-TRP deployment. Some example embodiments are as follows:

For Embodiment 1 configuring a higher layer parameter to the UE
when the higher layer parameter is configured, the UE assumes that the TCI state or QCL assumption for receiving aperiodic CSI-RS is identical to the TCI state or QCL assumption whichever is applied for the CORESET used for the PDCCH transmission that triggered the aperiodic CSI-RS
the QCL assumption of the CORESET used for the PDCCH transmission that triggered the aperiodic CSI-RS is used for receiving the aperiodic CSI-RS when the scheduling offset between the last symbol of the PDCCH carrying the triggering DCI and the first symbol of the aperiodic CSI-RS resources is equal to or greater than the UE reported threshold beamSwitchTiming For Embodiment 2 configuring a higher layer parameter to the UE
when the higher layer parameter is configured, the UE assumes that the TCI state or QCL assumption for receiving aperiodic CSI-RS is identical to the QCL assumption associated with the TCI state indicated in uplink related DCI that triggered the aperiodic CSI-RS
the QCL assumption associated with the TCI state indicated in the uplink related DCI that triggered the aperiodic CSI-RS is used for receiving the aperiodic CSI-RS when the scheduling offset between the last symbol of the PDCCH carrying the triggering DCI and the first symbol of the aperiodic CSI-RS resources is equal to or greater than the UE reported threshold beamSwitchTiming There are, proposed herein, various embodiments which address one or more of the issues disclosed herein.

In one aspect, a method performed by a wireless for determining a TCI state for receiving aperiodic CSI-RS is provided. The method includes receiving a higher layer configuration parameter(s) indicating a first option or a second option for determining a TCI state or a QCL assumption for receiving the aperiodic CSI-RS. In the first option, the TCI state or the QCL assumption for receiving the aperiodic CSI-RS is identical to a TCI state or an QCL assumption activated for a scheduling CORESET. In the second option, the TCI state or the QCL assumption for receiving the aperiodic CSI-RS is identical to a TCI state or an QCL assumption indicated in an uplink related DCI that triggers the aperiodic CSI-RS. The method also includes determining the TCI state or the QCL assumption based on the first option or the second option. The method also includes receiving the aperiodic CSI-RS based on the determined TCI state or the QCL assumption.

In another aspect, a method performed by a base station for indicating a TCI state for receiving aperiodic CSI-RS is provided. The method includes transmitting, to a wireless device, a higher layer configuration parameter(s) indicating a first option or a second option for determining a TCI state or an QCL assumption for receiving aperiodic CSI-RS. In the first option, the TCI state or the QCL assumption for receiving the aperiodic CSI-RS is identical to a TCI state or an QCL assumption activated for a scheduling CORESET. In the second option, the TCI state or the QCL assumption for receiving the aperiodic CSI-RS is identical to a TCI state or an QCL assumption indicated in an uplink related DCI that triggers the aperiodic CSI-RS. The method also includes transmitting the aperiodic CSI-RS based on the TCI state or the QCL assumption indicated via the first option or the second option.

Certain embodiments may provide one or more of the following technical advantage(s). The proposed solution significantly reduces the number of CSI-AssociatedReportConfigInfo's and CSI-AperiodicTriggerState's that need to be RRC configured to the UE. Hence, the proposed solution enables the possibility of triggering aperiodic CSI-RS with any of the TCI states while reducing the configuration overhead at the same time.

Figure 6:
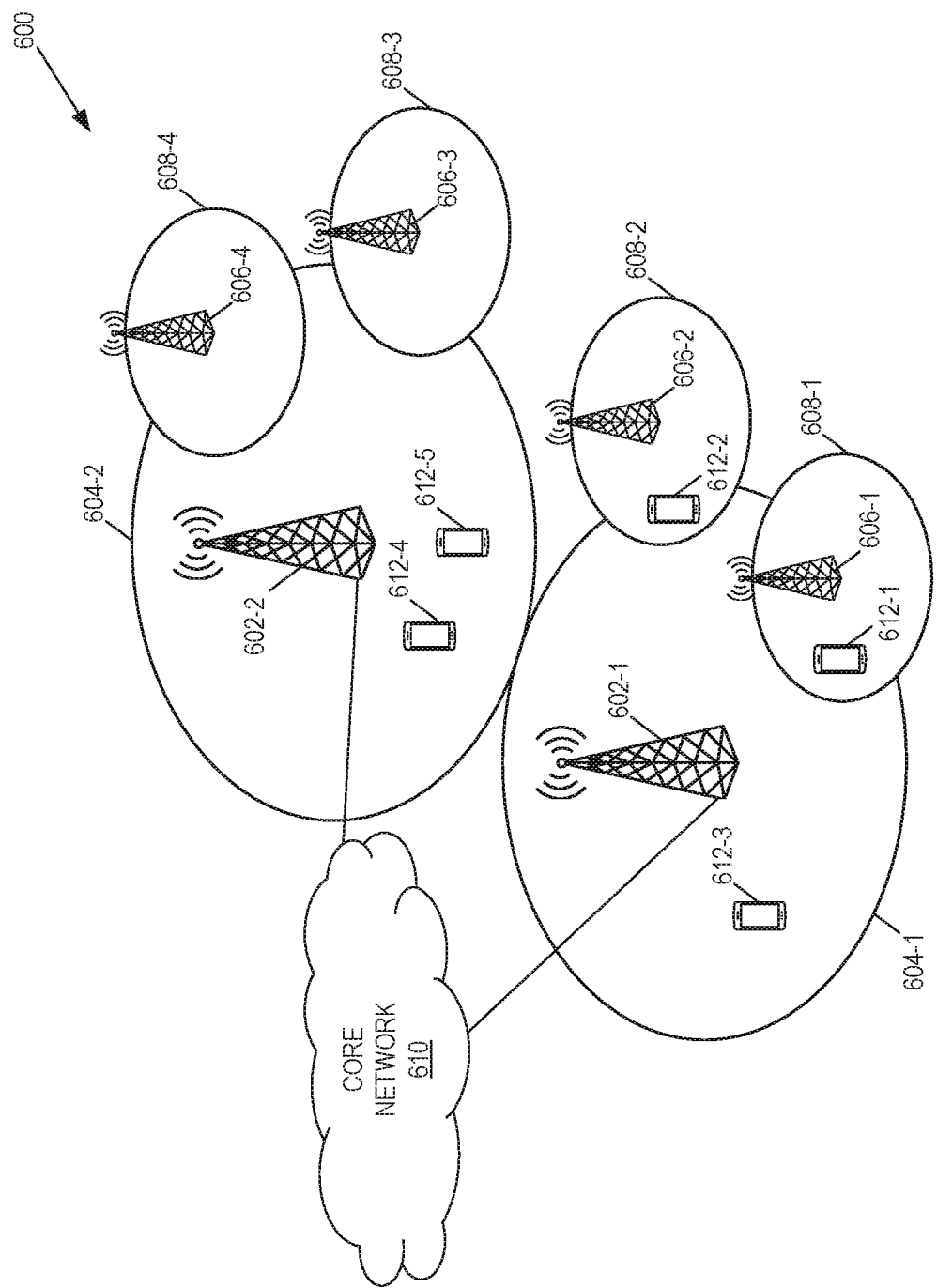
FIG. 6 illustrates one example of a cellular communications system in which embodiments of the present disclosure may be implemented.

FIG. 6 illustrates one example of a cellular communications system 600 in which embodiments of the present disclosure may be implemented. In the embodiments described herein, the cellular communications system 600 is a 5G system (5GS) including a Next Generation RAN (NG-RAN) and a 5G Core (5GC). In this example, the RAN includes base stations 602-1 and 602-2, which in the 5GS include NR base stations (gNBs) and optionally next generation eNBs (ng-eNBs) (e.g., LTE RAN nodes connected to the 5GC), controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5G System (5GS) is referred to as the 5GC. The base stations 602 (and optionally the low power nodes 606) are connected to the core network 610.

The base stations 602 and the low power nodes 606 provide service to wireless communication devices 612-1 through 612-5 in the corresponding cells 604 and 608. The wireless communication devices 612-1 through 612-5 are generally referred to herein collectively as wireless communication devices 612 and individually as wireless communication device 612. In the following description, the wireless communication devices 612 are oftentimes UEs, but the present disclosure is not limited thereto.

Before discussing specific embodiments of the present disclosure, methods performed by a wireless device(s) and a base station(s) for indicating a configuration parameter(s) for triggering aperiodic CSI-RS are first discussed with reference to FIGS. 7 and 8.

Figure 7:
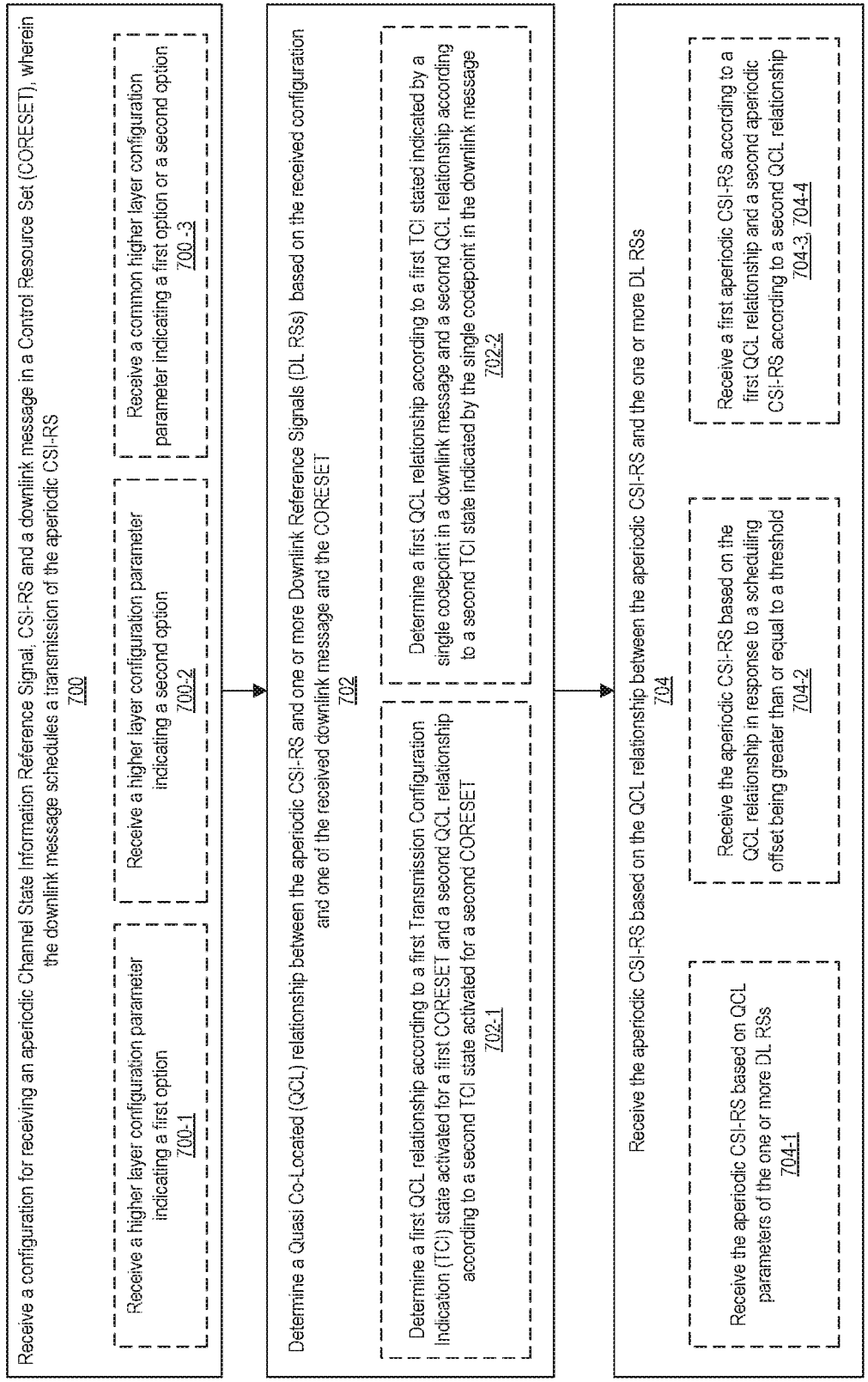
FIG. 7 is a flowchart of an exemplary method performed by a wireless device for receiving aperiodic CSI-RS.

FIG. 7 is a flowchart of an exemplary method performed by a wireless device for receiving an aperiodic CSI-RS. The wireless device is configured to receive a configuration for receiving an aperiodic CSI-RS and a downlink message in a CORESET, wherein the downlink message schedules a transmission of the aperiodic CSI-RS (step 700). In one embodiment, the wireless device can receive a higher layer configuration parameter indicating a first option (step 700-1). In one embodiment, the wireless device can receive a higher layer configuration parameter indicating a second option (step 700-2). In one embodiment, the wireless device can receive a common higher layer configuration parameter indicating a first option and a second option (step 700-3).

The wireless device is also configured to determine a QCL relationship between the aperiodic CSI-RS and one or more Downlink Reference Signals (DL RSs) based on the received configuration and one of the received downlink message and the CORESET (step 702). In one embodiment, the wireless device can determine a first QCL relationship for receiving a first CSI-RS according to a first TCI state activated for a first CORESET and a second QCL relationship for receiving a second CSI-RS according to a second TCI state activated for a second CORESET (step 702-1). In one embodiment, the wireless device can determine the first QCL relationship according to a first TCI state indicated by a single codepoint in a downlink message and the second QCL relationship according to a second TCI state indicated by the single codepoint in the downlink message (step 702-2).

The wireless device is further configured to receive the aperiodic CSI-RS based on the QCL relationship between the aperiodic CSI-RS and the one or more DL RSs (step 704). In one embodiment, the wireless device can receive the aperiodic CSI-RS based on QCL parameters of the one or more DL RSs (step 704-1). In one embodiment, the wireless device can receive the aperiodic CSI-RS based on the QCL relationship in response to a scheduling offset being greater than or equal to a threshold (step 704-2). In one embodiment, the wireless device can receive a first aperiodic CSI-RS according to a first QCL relationship and a second aperiodic CSI-RS according to a second QCL relationship (steps 704-3, 704-4).

Figure 8:
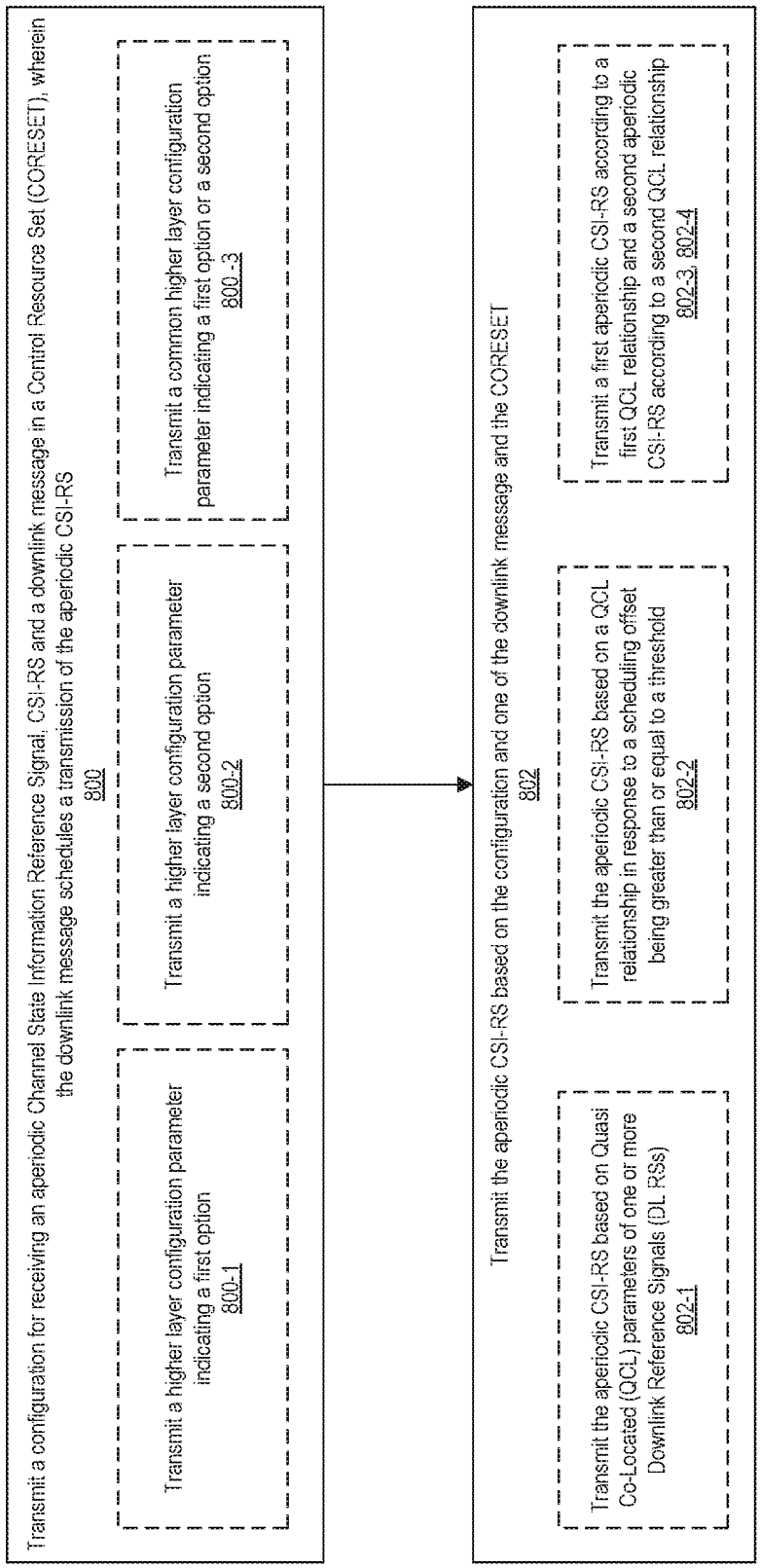
FIG. 8 is a flowchart of an exemplary method performed by a base station for enabling a wireless device to receive aperiodic CSI-RS.

FIG. 8 is a flowchart of an exemplary method performed by a base station for enabling a wireless device to receive aperiodic CSI-RS. The base station is configured to transmit a configuration for receiving an aperiodic CSI-RS and a downlink message in a CORESET, wherein the downlink message schedules a transmission of the aperiodic CSI-RS (step 800). In one embodiment, the base station can transmit a higher layer configuration parameter indicating a first option (step 800-1). In one embodiment, the base station can transmit a higher layer configuration parameter indicating a second option (step 800-2). In one embodiment, the base station can transmit a common higher layer configuration parameter indication a first option and a second option (step 800-3).

The base station is further configured to transmit the aperiodic CSI-RS based on the configuration and one of the downlink message and the CORESET (step 802). In one embodiment, the base station can transmit the aperiodic CSI-RS based on QCL parameters of the one or more DL RSs (step 802-1). In one embodiment, the base station can transmit the aperiodic CSI-RS based on the QCL relationship in response to a scheduling offset being greater than or equal to a threshold (step 802-2). In one embodiment, the base station can transmit a first aperiodic CSI-RS according to a first QCL relationship and a second aperiodic CSI-RS according to a second QCL relationship (steps 802-3, 802-4).

Figure 9:
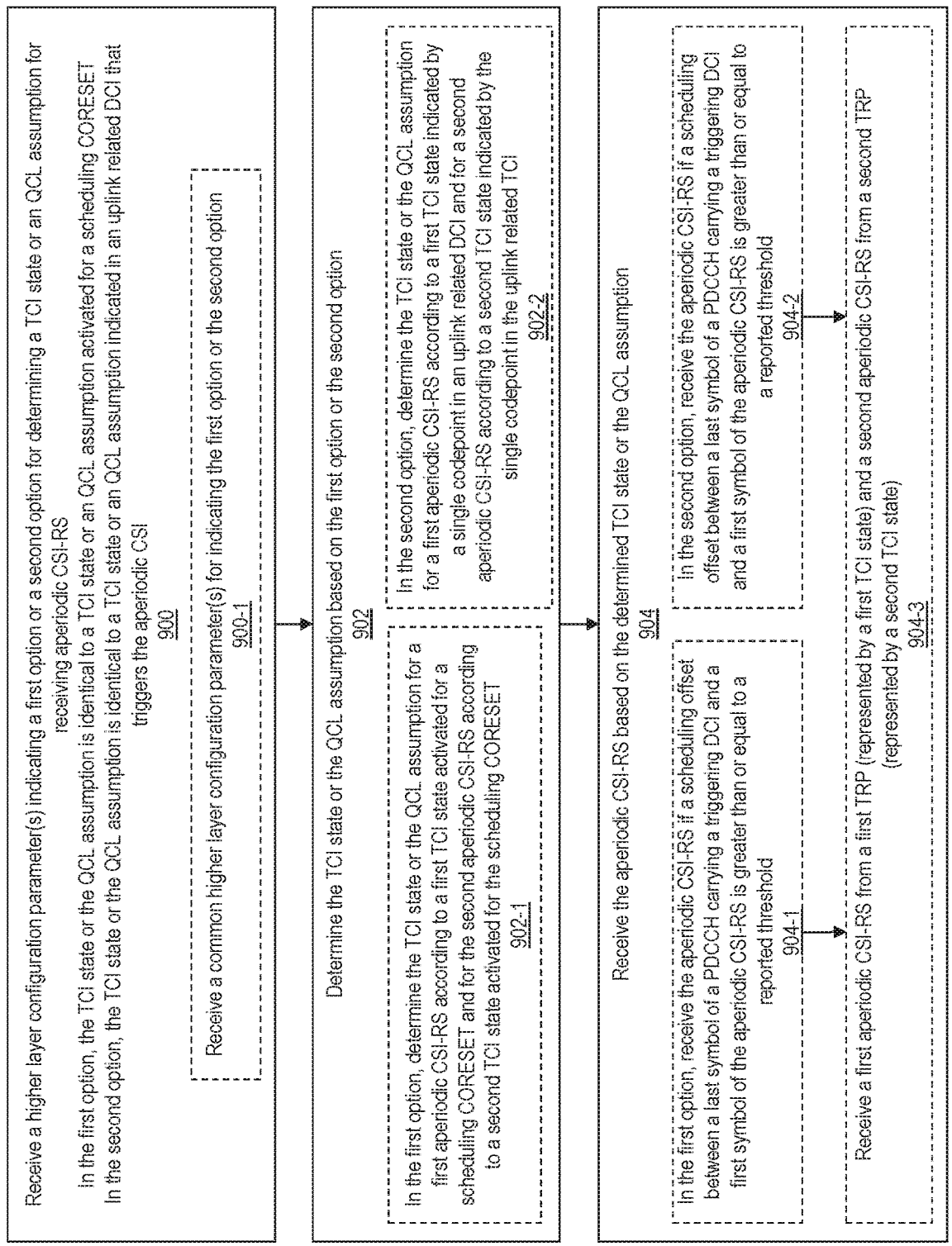
FIG. 9 is a flowchart of an exemplary method performed by a wireless device for determining a Transmission Configuration Indication (TCI) state for receiving aperiodic CSI-RS.

In one aspect, a wireless device (e.g., the wireless communication devices 612-1 through 612-5) can perform a method for determining a TCP state for receiving aperiodic CSI-RS. In this regard, FIG. 9 is a flowchart of an exemplary method performed by a wireless device for determining a TCI state for receiving an aperiodic CSI-RS. The method includes receiving a higher layer configuration parameter(s) indicating a first option or a second option for determining a TCI state or a QCL assumption for receiving the aperiodic CSI-RS (step 900). Specifically, if the first option is indicated, the TCI state or the QCL assumption for receiving the aperiodic CSI-RS is identical to a TCI state or an QCL assumption activated for a scheduling CORESET. Alternatively, if the second option is indicated, the TCI state or the QCL assumption for receiving the aperiodic CSI-RS is identical to a TCI state or an QCL assumption indicated in an uplink related DCI that triggers the aperiodic CSI-RS. The method also includes determining the TCI state or the QCL assumption based on the first option or the second option (step 902). The method also includes receiving the aperiodic CSI-RS based on the determined TCI state or the QCL assumption (step 904).

Figure 10:
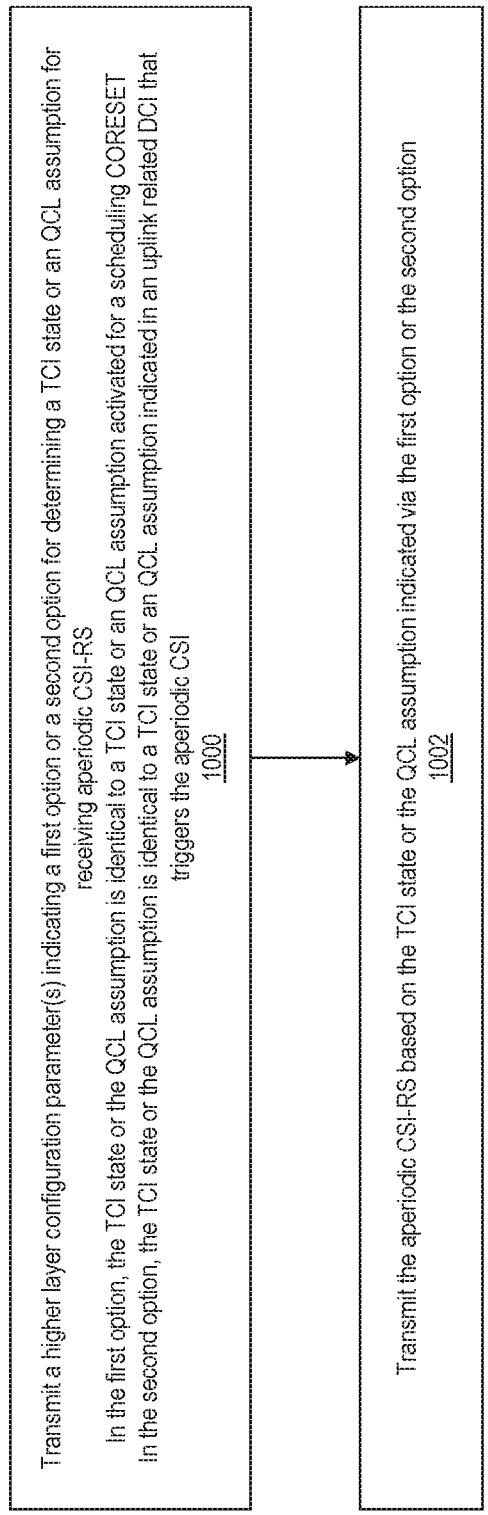
FIG. 10 is a flowchart of an exemplary method performed by a base station for indicating a TCI state for receiving aperiodic CSI-RS.

In another aspect, a base station (e.g., the base stations 602-1 and 602-2) can perform a method for indicating a TCI state for receiving aperiodic CSI-RS by a wireless device. In this regard, FIG. 10 is a flowchart of an exemplary method performed by a base station for indicating a TCI state for receiving an aperiodic CSI-RS. The method includes transmitting, to a wireless device, a higher layer configuration parameter(s) indicating a first option or a second option for determining a TCI state or an QCL assumption for receiving aperiodic the CSI-RS (step 1000). Specifically, if the first option is indicated, the TCI state or the QCL assumption for receiving the aperiodic CSI-RS is identical to a TCI state or an QCL assumption activated for a scheduling CORESET. Alternatively, if the second option is indicated, the TCI state or the QCL assumption for receiving the aperiodic CSI-RS is identical to a TCI state or an QCL assumption indicated in an uplink related DCI that triggers the aperiodic CSI-RS. The method also includes transmitting the aperiodic CSI-RS based on the TCI state or the QCL assumption indicated via the first option or the second option (step 1002).

Specific embodiments of the present disclosure are discussed below.

Embodiment 1 (e.g., Steps 700-1, 800-1):
Following TCI State Activated for Scheduling CORESET In this embodiment (also referred to as "first option" hereinafter), the UE is configured via a higher layer parameter such that the UE assumes that the TCI state or QCL assumption for receiving aperiodic CSI-RS is identical to the TCI state or QCL assumption whichever is applied for the CORESET used for the PDCCH transmission that triggered the aperiodic CSI-RS (e.g., step 702-1). In the following discussion, the term scheduling CORESET is used to refer to the CORESET used for the PDCCH transmission that triggers the aperiodic CSI-RS.

In one embodiment (e.g., steps 704-2, 802-2), if the above higher layer parameter is configured and the scheduling offset between the last symbol of the PDCCH carrying the triggering DCI and the first symbol of the aperiodic CSI-RS resources is equal to or greater than the UE reported threshold beamSwitchTiming as defined in [TS 38.306], then the aperiodic CSI-RS is received by the UE with the QCL assumption in the activated TCI state of the scheduling CORESET.

In an alternate embodiment, if the above higher layer parameter is configured, regardless of the scheduling offset between the last symbol of the PDCCH carrying the triggering DCI and the first symbol of the aperiodic CSI-RS resources, the aperiodic CSI-RS is received by the UE with the QCL assumption in the activated TCI state of the scheduling CORESET.

FIG. 11 shows an example of a higher layer parameter that enables the UE to receive aperiodic CSI-RS using the TCI state activated for the scheduling CORESET. In this example, a higher layer parameter 'followControlResourceSetTCIState' is configured in the CSI-AssociatedReportConfigInfo. This higher layer parameter is optional and is only applicable when the NZP CSI-RS configured in the CSI-AssociatedReportConfigInfo is of type Aperiodic. Hence, the condition 'Cond Aperiodic' is attached to this optional higher layer parameter. Note that the NZP CSI-RS in the AssociatedReportConfigInfo can also be periodic or semi-persistent when aperiodic CSI is computed using periodic or semi-persistent CSI-RS. In the cases when the NZP CSI-RS in the AssociatedReportConfigInfo is either periodic or semi-persistent, the 'followControlResourceSetTCIState' parameter is not applicable.

Figure 12:
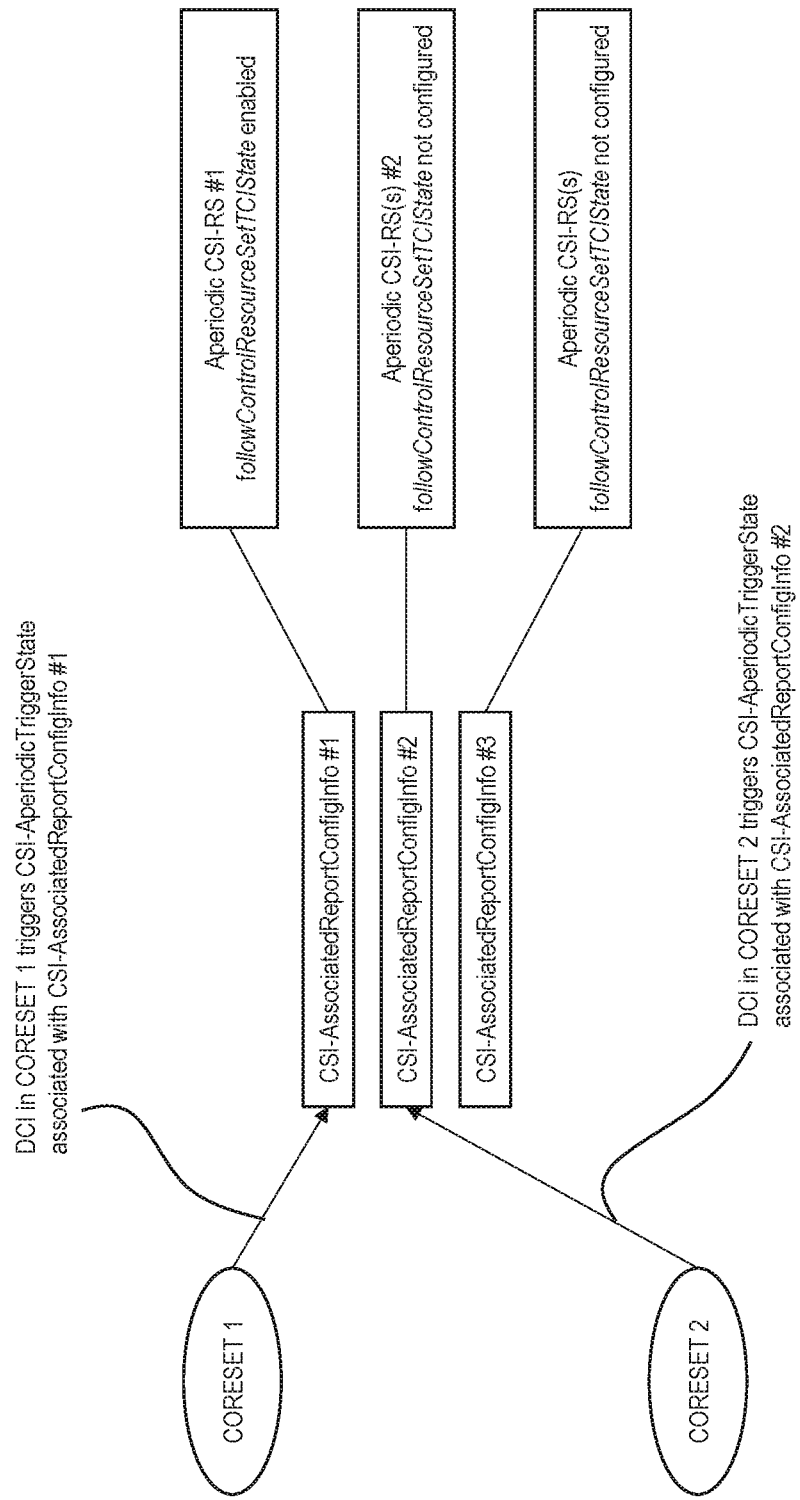
FIG. 12 shows an example of a followControlResourceSetTCIState parameter configured per CSI-AssociatedReportConfigInfo.

FIG. 12 shows an illustration on the use of 'followControlResourceSetTCIState' parameter configured per CSI-AssociatedReportConfigInfo. In this example, the UE is configured with three CSI-AperiodicTriggerState's corresponding to three CSI-AssociatedReportConfigInfo's as follows:

In CSI-AssociatedReportConfigInfo #1, aperiodic CSI-RS #1 is configured for channel measurement and the followControlResourceSetTCIState parameter is configured to be enabled.

In CSI-AssociatedReportConfigInfo #2, aperiodic CSI-RS(s) #2 is configured for channel measurement and the followControlResourceSetTCIState parameter is not configured.

In CSI-AssociatedReportConfigInfo #3, periodic CSI-RS(s) is configured for channel measurement. In this case, the followControlResourceSetTCIState parameter is not configured as this parameter is not applicable for periodic CSI-RS(s).

As shown in FIG. 12, if a DCI triggers the CSI-AperiodicTriggerState corresponding to CSI-AssociatedReportConfigInfo #1 via a PDDCH received by the UE in CORESET 1, then aperiodic CSI-RS #1 is received by the UE with the QCL assumption in TCI state #1 of CORESET #1 (note that TCI state #1 is the activated TCI state for CORESET #1). In some embodiment, this QCL assumption is applied to aperiodic CSI-RS #1 only when the scheduling offset between the last symbol of the PDCCH carrying the triggering DCI and the first symbol of aperiodic CSI-RS #1 is equal to or greater than the UE reported threshold beamSwitchTiming.

On the other hand, if a DCI triggers the CSI-AperiodicTriggerState corresponding to CSI-AssociatedReportConfigInfo #2 via a PDDCH received by the UE in CORESET 2, then aperiodic CSI-RS #2 is received by the UE with the QCL assumption using the TCI state(s) provided by the qcl-info parameter in CSI-AssociatedReportConfigInfo #2 as followControlResourceSetTCIState parameter is not configured in CSI-AssociatedReportConfigInfo #2.

This example illustrates a key benefit in configuring followControlResourceSetTCIState parameter in CSI-AssociatedReportConfigInfo. This lets the scheduler dynamically switch between following the QCL assumption provided by the qcl-info parameter and following the activated TCI state of the scheduling CORESET for aperiodic CSI-RS. Following the QCL assumption provided by the qcl-info parameter for aperiodic CSI-RS(s) may be beneficial when the gNB scheduler wants to identify a suitable beam by triggering an CSI-AssociatedReportConfigInfo which contains multiple aperiodic CSI-RSs in the resourceSet. Following the TCI state activated for the scheduling CORESET is beneficial when a suitable beam is identified (i.e., the beam corresponding to the source RS with QCL Type D in the TCI state activated for the scheduling CORESET) and the gNB scheduler wants to trigger a CSI report corresponding to the identified beam.

Although the examples in FIG. 11 and FIG. 12 show that the followControlResourceSetTCIState parameter is configured per CSI-AssociatedReportConfigInfo, the parameter can alternatively be configured in other places such as the follows:

followControlResourceSetTCIState may be configured per CSI-AperiodicTriggerState followControlResourceSetTCIState may be configured per NZP-CSI-RS-Resource information element in 3GPP TS 38.331 followControlResourceSetTCIState may be configured per NZP-CSI-RS-ResourceSet information element in 3GPP TS 38.331 followControlResourceSetTCIState may be configured per CSI-ResourceConfig information element in 3GPP TS 38.331. For instance, the followControlResourceSetTCIState parameter can be set to enable when the resourceType parameter is 'aperiodic' and one or more NZP-CSI-RS-ResourceSet's are configured for channel measurement.

followControlResourceSetTCIState may be configured per CSI-ResourceConfig information element in 3GPP TS 38.331.

followControlResourceSetTCIState may be configured per ControlResourceSet information element in 3GPP TS 38.331.

In some embodiments, the configuration for followControlResourceSetTCIState may be implicit. For instance, if qcl-info is not configured in a CSI-AssociatedReportConfigInfo and the UE is configured with aperiodic CSI-RS(s) in resourceSet in the CSI-AssociatedReportConfigInfo, then the aperiodic CSI-RS(s) is received by the UE with the QCL assumption in the activated TCI state of the scheduling CORESET. This is equivalent to configuring followControlResourceSetTCIState to 'enabled' in the CSI-AssociatedReportConfigInfo.

CORESET is enabled/disabled per NZP CSI-RS resource in an NZP CSI-RS resource set. An example is provided in FIG. 13. In this example, the CSI-AssociatedReportConfigInfo contains an NZP CSI-RS resource set (given by 'resourceSet'), which can have up to 'maxNrofNZP-CSI-RS-ResourceSetsPerConfig' aperiodic NZP CSI-RS resources. According to this embodiment, the UE is higher layer configured with parameter followControlResourceSetTCIState, which is a sequence of binary indicators (e.g., Booleans), with one indicator per aperiodic NZP CSI-RS resource in the NZP CSI-RS resource set. When the jth indicator in followControlResourceSetTCIState is enabled (e.g., the jth Boolean is set to 1), then regardless of the scheduling offset between the last symbol of the PDCCH carrying the triggering DCI and the first symbol of the jth aperiodic NZP CSI-RS resource in the resourceSet, the jth aperiodic NZP CSI-RS is received by the UE with the QCL assumption in the activated TCI state of the scheduling CORESET.

Embodiment 2 (e.g., Steps 700-2, 800-2): Following TCI State in Uplink Related DCI In this embodiment (also referred to as "second option" hereinafter), the UE is configured via a higher layer parameter such that the UE assumes that the TCI state or QCL assumption for receiving aperiodic CSI-RS is identical to the TCI state indicated in uplink related DCI (i.e., via DCI formats 0_1 or 0_2) (e.g., step 702-2).

This firstly requires that a TCI field is present in uplink related DCI formats. This can be ensured by explicitly configuring the presence of the TCI fields in uplink related DCI formats in the ControlResourceSet information element in 3GPP TS 38.331. For example, a new parameter tci-PresentInDCI-ForDCI-Format0-2 can be configured in the ControlResourceSet information element to enable presence of a new TCI field in DCI with DCI format 0_2 scheduled via the CORESET.

Secondly, a higher layer parameter is needed that enables the UE to receive aperiodic CSI-RS using the TCI state indicated in uplink related DCI. FIG. 14 shows an example of such a higher layer parameter which is configured in the CSI-AssociatedReportConfigInfo. The higher layer parameter 'followTciInDCI' is optional and is only applicable when the NZP CSI-RS configured in the CSI-AssociatedReportConfigInfo is of type Aperiodic. Hence, the condition 'Cond Aperiodic' is attached to this optional higher layer parameter.

In this embodiment, if the following conditions are met, then the aperiodic CSI-RS triggered by the uplink related DCI is received by the UE with the QCL assumption in the TCI state indicated in the TCI field of the uplink related DCI.
  TCI field is present in scheduling uplink related DCI the presence of which is configured via a higher layer parameter configured in the scheduling CORESET as described above,
  the higher layer parameter 'followTciInDCI' is configured in the CSI-AssociatedReportConfigInfo that is being triggered (i.e., the CSI-AssociatedReportConfigInfo that is associated with the CSI-AperiodicTriggerState that is being triggered by the uplink related DCI), and
  the scheduling offset between the last symbol of the PDCCH carrying the triggering DCI and the first symbol of the aperiodic CSI-RS resources is equal to or greater than the UE reported threshold beamSwitchTiming as defined in [TS 38.306], Similar to the example in FIG. 10, with this embodiment, the scheduler can dynamically switch between following the QCL assumption provided by the qcl-info parameter and following the TCI state indicated in uplink related DCI for aperiodic CSI-RS. This depends on whether or not the higher layer parameter 'followTciInDCI' is configured in the CSI-AssociatedReportConfigInfo that is being triggered. If 'followTciInDCI' is not configured in the CSI-AssociatedReportConfigInfo that is being triggered, then the UE follows the QCL assumption provided by the qcl-info parameter for aperiodic CSI-RS(s). If 'followTciInDCI' is configured in the CSI-AssociatedReportConfigInfo that is being triggered, then the UE follows the QCL assumption given by the TCI state indicated in the uplink related DCI for aperiodic CSI-RS(s).

Although the examples in FIG. 14 show that the followTciInDCI parameter is configured per CSI-AssociatedReportConfigInfo, the parameter can alternatively be configured in other places such as the follows:
  followTciInDCI may be configured per CSI-Aperiodic-TriggerState
  followTciInDCI may be configured per NZP-CSI-RS-Resource information element in 3GPP TS 38.331
  followTciInDCI may be configured per NZP-CSI-RS-ResourceSet information element in 3GPP TS 38.331
  followTciInDCI may be configured per CSI-ResourceConfig information element in 3GPP TS 38.331. For instance, the followTciInDCI parameter can be set to enable when the resourceType parameter is 'aperiodic' and one or more NZP-CSI-RS-ResourceSet's are configured for channel measurement.
  followTciInDCI may be configured per CSI-ResourceConfig information element in 3GPP TS 38.331.
  followTciInDCI may be configured per ControlResourceSet information element in 3GPP TS 38.331.

In some embodiments, the configuration for followTciInDCI may be implicit. For instance, if qcl-info is not configured in a CSI-AssociatedReportConfigInfo and the UE is configured with aperiodic CSI-RS(s) in resourceSet in the CSI-AssociatedReportConfigInfo, then the UE follows the QCL assumption given by the TCI state indicated in the uplink related DCI for aperiodic CSI-RS(s). This is equivalent to configuring followTciInDCI to 'enabled' in the CSI-AssociatedReportConfigInfo.

In another embodiment, whether the UE should follow the TCI indicated in the uplink related DCI is enabled/disabled per NZP CSI-RS resource in an NZP CSI-RS resource set. An example is provided in FIG. 15. In this example, the CSI-AssociatedReportConfigInfo contains an NZP CSI-RS resource set (given by 'resourceSet') which can have up to 'maxNrofNZP-CSI-RS-ResourceSetsPerConfig' aperiodic NZP CSI-RS resources. According to this embodiment, the UE is higher layer configured with parameter followTciInDCI, which is a sequence of binary indicators (e.g., Booleans), with one indicator per aperiodic NZP CSI-RS resource in the NZP CSI-RS resource set. When the jth indicator in followTciInDCI is enabled (e.g., the jth Boolean is set to 1), then regardless of the scheduling offset between the last symbol of the PDCCH carrying the triggering DCI and the first symbol of the jth aperiodic NZP CSI-RS resource in the resourceSet, the jth aperiodic NZP CSI-RS is received by the UE with the QCL assumption in the TCI indicated in the uplink related DCI.

Embodiment 3 (e.g., Steps 700-3, 800-3): Common Higher Layer Parameter for Following Either TCI State in Uplink Related DCI or TCI State Activated for Scheduling CORESET In this embodiment, the UE is configured a common higher layer parameter that determines whether the UE follows the TCI State indicated in uplink related DCI or the TCI state activated for scheduling CORESET. For instance, a common parameter 'followTciInDCIorControlResourceSet' may be configured in the CSI-AssociatedReportConfigInfo and the following UE behavior is specified for receiving aperiodic CSI-RS:

- if the scheduling offset between the last symbol of the PDCCH carrying the triggering DCI and the first symbol of the aperiodic CSI-RS resources is equal to or greater than the UE reported threshold beamSwitchTiming as defined in [TS 38.306]
    o if followTciInDCIorControlResourceSet is configured and set to enable in the CSI-AssociatedReportConfigInfo being triggered
        ■ if TCI field is present in the uplink related DCI
            • the aperiodic CSI-RS is received by the UE with the QCL assumption given by the TCI state indicated in the uplink related DCI
        ■ else
            • the aperiodic CSI-RS is received by the UE with the QCL assumption in the activated TCI state of the scheduling CORESET
        ■ end;
    o else
        ■ the UE follows the QCL assumption provided by the qcl-info parameter in the CSI-AssociatedReportConfigInfo being triggered for aperiodic CSI-RS(s)
    o end;
- else
    o if there is any other downlink signal with an indicated TCI state in the same symbols as the CSI-RS,
        ■ the UE applies the QCL assumption of the other signal when receiving the aperiodic CSI-RS (i.e., the UE applies the TCI state indicated for the PDSCH to also receive the aperiodic CSI-RS).
    o Else
        ■ when receiving the aperiodic CSI-RS, the UE applies the QCL assumption (i.e., the TCI state) used for the CORESET associated with a monitored search space with the lowest controlResourceSetId in the latest slot in which one or more CORESETs within the active BWP of the serving cell are monitored.
    o end;
- end;

Embodiment 4 (e.g., Steps 704-3, 704-4, 802-3, 802-4): Extension to Support Multi-TRP The above embodiments can be easily extended to support multi-TRP deployments. For multi-TRP deployments, two aperiodic NZP CSI-RSs (e.g., one from each TRP) from a resource set may be triggered jointly to compute CSI. Alternatively, the aperiodic NZP CSI-RSs corresponding to different TRPs may be configured as part of two resource sets (e.g., one resource set per TRP).

To extend Embodiment 2 to this multi-TRP case, a TCI field in uplink DCI can indicate 2 TCI states using a single codepoint in the TCI field (e.g., 702-2). At the same time, the uplink DCI also triggers a CSI-AssociatedReportConfigInfo that has two aperiodic CSI-RSs from the same resource set for channel measurement. If this AssociatedReportConfigInfo has the followTciInDCI configured, then the UE receives the two aperiodic CSI-RSs as follows:
    the first aperiodic CSI-RS triggered by the uplink related DCI is received by the UE with the QCL assumption in the first TCI state indicated in the TCI field of the uplink related DCI, and
    the second aperiodic CSI-RS triggered by the uplink related DCI is received by the UE with the QCL assumption in the second TCI state indicated in the TCI field of the uplink related DCI Note that the above embodiment can also be applied to the case when the two aperiodic CSI-RSs used for channel measurement are from two different resource sets configured in the same AssociatedReportConfigInfo.

Figure 16:
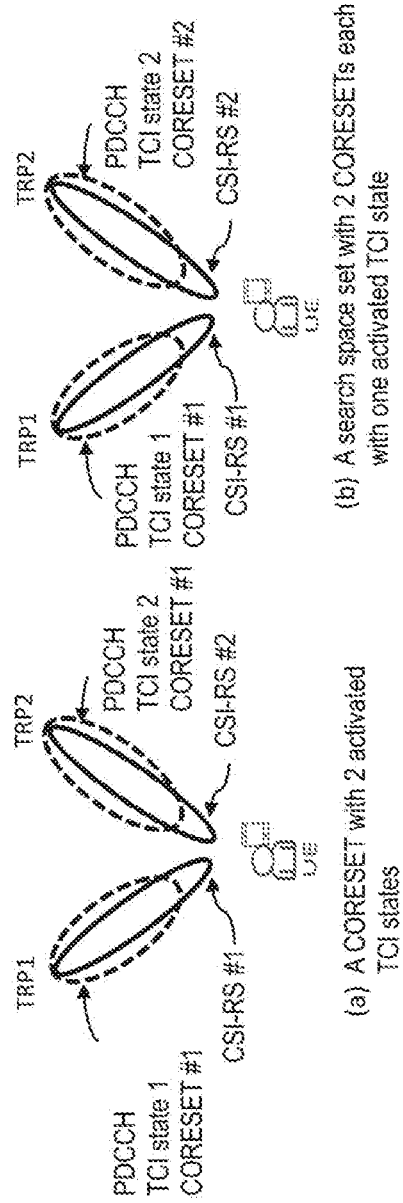
FIG. 16 shows an example of two aperiodic CSI-RS resources triggered by a Physical Downlink Control Channel (PDCCH)

In another embodiment, embodiment 1 can be extended to the case where two TCI states (e.g., each TCI state associated with one TRP) are activated for a CORESET or to the case where a search space set contains 2 CORESETs each with one activated TCI state. In this case, a PDCCH carrying an aperiodic CSI-RS trigger may be transmitted from one or both TRPs each associated with one TCI state. If there is one aperiodic CSI-RS resource in the triggered CSI-RS resource set, the UE assumes that the aperiodic CSI-RS resource is QCL with the first activated TCI state of the CORESET or the activated TCI state of the 1st CORESET in the search space set in which the PDCCH is detected. If there are two aperiodic CSI-RS resources, the UE assumes that the first and the second aperiodic CSI-RS resources are respectively QCL with the first and the second activated TCI states of the CORESET or the activated TCI states of the 1st and the second CORESETs in the search space set in which the PDCCH is detected. An example is shown in FIG. 16, where two aperiodic CSI-RS resources are triggered by a PDCCH. The PDCCH is transmitted in either a single CORESET with two activated TCI states (FIG. 16(a)) or a search space containing two CORESETs each with one activated TCI state (FIG. 16(b)). Each TCI state is associated with one TRP. The PDCCH is transmitted from both TRPs through either spatial, time, or frequency division multiplexing (i.e., SDM, TDM, or FDM). Each of the two aperiodic CSI-RS is transmitted from one TRP.

In another embodiment, when there are two aperiodic CSI-RS resources, then the following rules can be defined:
    the first aperiodic CSI-RS triggered by the uplink related DCI is received by the UE with the QCL assumption in the activated TCI state of the scheduling CORESET, and
    the second aperiodic CSI-RS triggered by the uplink related DCI is received by the UE with the QCL assumption in the TCI state indicated in the TCI field of the uplink related DCI In the above embodiment, only a single TCI state needs to be indicated in the DCI. The above embodiment applies the solutions described in embodiments 1 and 2 for receiving the 1st and 2nd aperiodic CSI-RSs.

Figure 17:
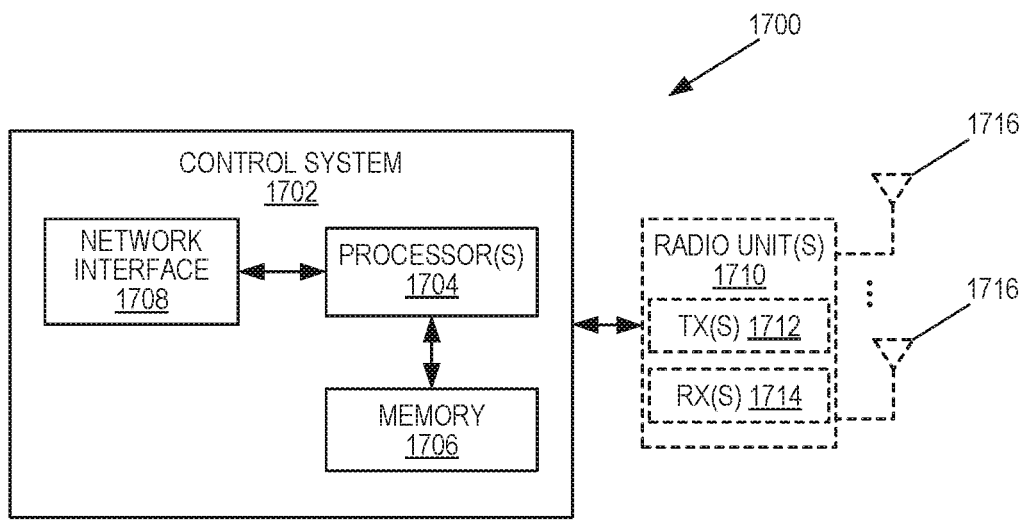
FIG. 17 is a schematic block diagram of a radio access node according to some embodiments of the present disclosure.

FIG. 17 is a schematic block diagram of a radio access node 1700 according to some embodiments of the present disclosure. Optional features are represented by dashed boxes. The radio access node 1700 may be, for example, a base station 602 or 606 or a network node that implements all or part of the functionality of the base station 602 or gNB described herein. As illustrated, the radio access node 1700 includes a control system 1702 that includes one or more processors 1704 (e.g., Central Processing Units (CPUs), Application Specific Integrated Circuits (ASICs), Field Programmable Gate Arrays (FPGAs), and/or the like), memory 1706, and a network interface 1708. The one or more processors 1704 are also referred to herein as processing circuitry. In addition, the radio access node 1700 may include one or more radio units 1710 that each includes one or more transmitters 1712 and one or more receivers 1714 coupled to one or more antennas 1716. The radio units 1710 may be referred to or be part of radio interface circuitry. In some embodiments, the radio unit(s) 1710 is external to the control system 1702 and connected to the control system 1702 via, e.g., a wired connection (e.g., an optical cable). However, in some other embodiments, the radio unit(s) 1710 and potentially the antenna(s) 1716 are integrated together with the control system 1702. The one or more processors 1704 operate to provide one or more functions of a radio access node 1700 as described herein. In some embodiments, the function(s) are implemented in software that is stored, e.g., in the memory 1706 and executed by the one or more processors 1704.

Figure 18:
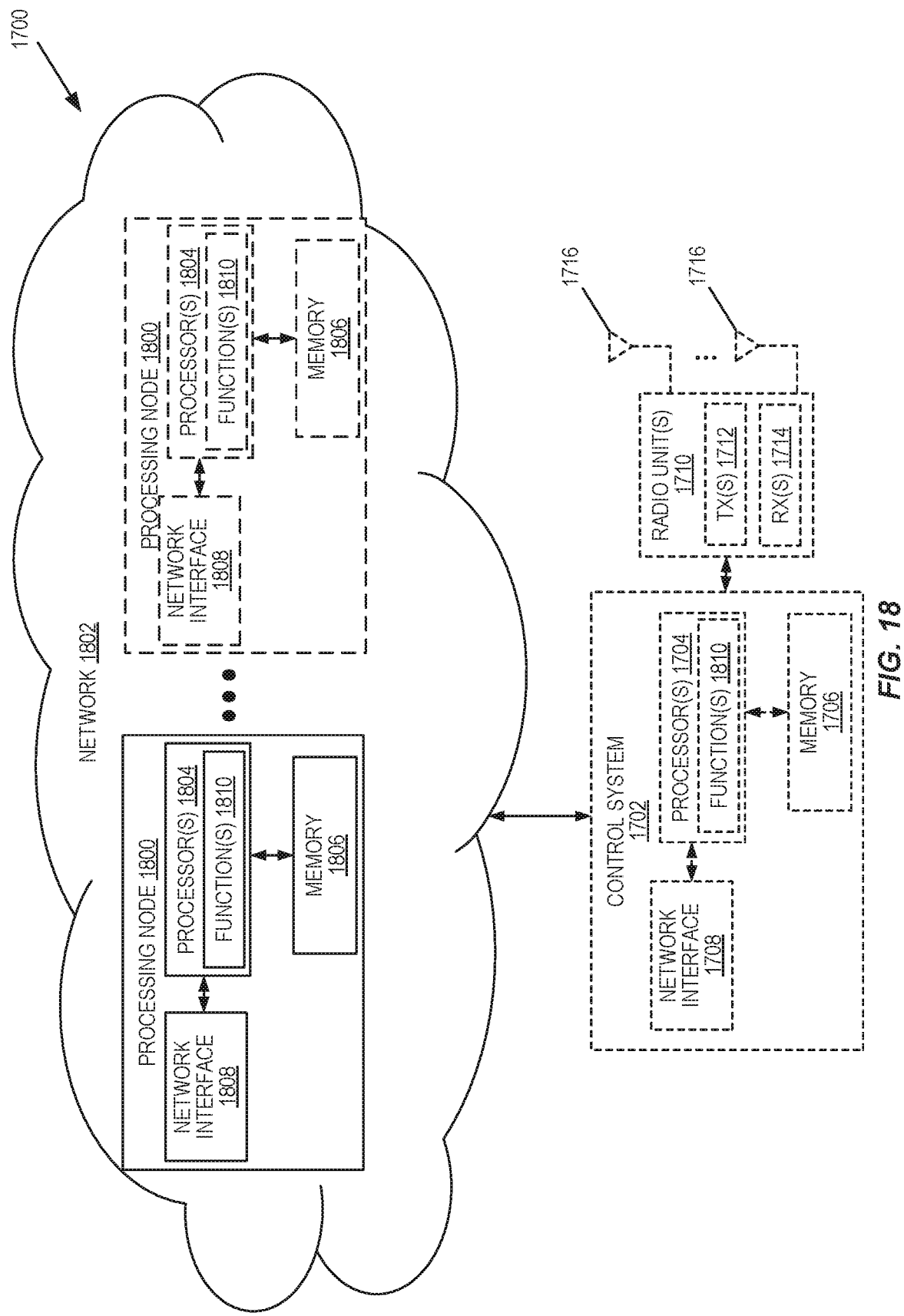
FIG. 18 is a schematic block diagram that illustrates a virtualized embodiment of the radio access node according to some embodiments of the present disclosure.

FIG. 18 is a schematic block diagram that illustrates a virtualized embodiment of the radio access node 1700 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1700 in which at least a portion of the functionality of the radio access node 1700 is implemented as a virtual component(s) (e.g., via a virtual machine(s) executing on a physical processing node(s) in a network(s)). As illustrated, in this example, the radio access node 1700 may include the control system 1702 and/or the one or more radio units 1710, as described above. The control system 1702 may be connected to the radio unit(s) 1710 via, for example, an optical cable or the like. The radio access node 1700 includes one or more processing nodes 1800 coupled to or included as part of a network(s) 1802. If present, the control system 1702 or the radio unit(s) are connected to the processing node(s) 1800 via the network 1802. Each processing node 1800 includes one or more processors 1804 (e.g., CPUs, ASICs, FPGAs, and/or the like), memory 1806, and a network interface 1808.

In this example, functions 1810 of the radio access node 1700 described herein are implemented at the one or more processing nodes 1800 or distributed across the one or more processing nodes 1800 and the control system 1702 and/or the radio unit(s) 1710 in any desired manner. In some particular embodiments, some or all of the functions 1810 of the radio access node 1700 described herein are implemented as virtual components executed by one or more virtual machines implemented in a virtual environment(s) hosted by the processing node(s) 1800. As will be appreciated by one of ordinary skill in the art, additional signaling or communication between the processing node(s) 1800 and the control system 1702 is used in order to carry out at least some of the desired functions 1810. Notably, in some embodiments, the control system 1702 may not be included, in which case the radio unit(s) 1710 communicate directly with the processing node(s) 1800 via an appropriate network interface(s).

In some embodiments, a computer program including instructions which, when executed by at least one processor, causes the at least one processor to carry out the functionality of radio access node 1700 or a node (e.g., a processing node 1800) implementing one or more of the functions 1810 of the radio access node 1700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
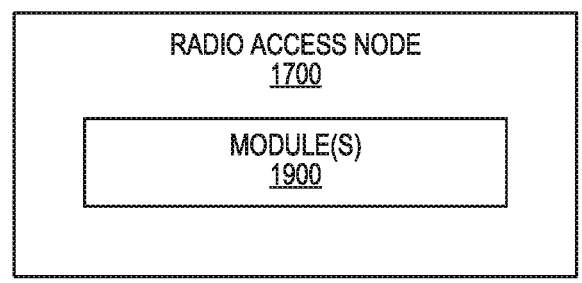
FIG. 19 is a schematic block diagram of the radio access node according to some other embodiments of the present disclosure.

FIG. 19 is a schematic block diagram of the radio access node 1700 according to some other embodiments of the present disclosure. The radio access node 1700 includes one or more modules 1900, each of which is implemented in software. The module(s) 1900 provide the functionality of the radio access node 1700 described herein. This discussion is equally applicable to the processing node 1800 of FIG. 18 where the modules 1900 may be implemented at one of the processing nodes 1800 or distributed across multiple processing nodes 1800 and/or distributed across the processing node(s) 1800 and the control system 1702.

Figure 20:
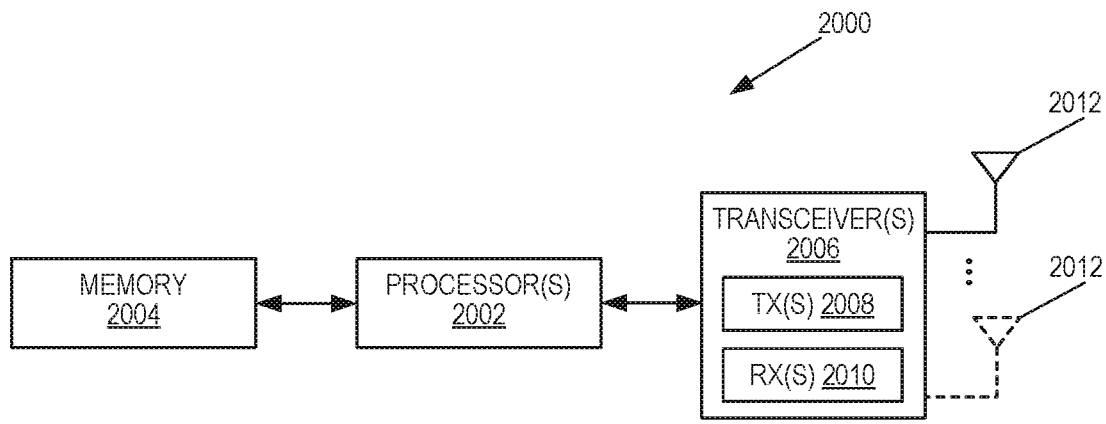
FIG. 20 is a schematic block diagram of a wireless communication device according to some embodiments of the present disclosure.

FIG. 20 is a schematic block diagram of a wireless communication device 2000 according to some embodiments of the present disclosure. As illustrated, the wireless communication device 2000 includes one or more processors 2002 (e.g., CPUs, ASICs, FPGAs, and/or the like), memory 2004, and one or more transceivers 2006 each including one or more transmitters 2008 and one or more receivers 2010 coupled to one or more antennas 2012. The transceiver(s) 2006 includes radio-front end circuitry connected to the antenna(s) 2012 that is configured to condition signals communicated between the antenna(s) 2012 and the processor(s) 2002, as will be appreciated by on of ordinary skill in the art. The processors 2002 are also referred to herein as processing circuitry. The transceivers 2006 are also referred to herein as radio circuitry. In some embodiments, the functionality of the wireless communication device 2000 described above may be fully or partially implemented in software that is, e.g., stored in the memory 2004 and executed by the processor(s) 2002. Note that the wireless communication device 2000 may include additional components not illustrated in FIG. 20 such as, e.g., one or more user interface components (e.g., an input/output interface including a display, buttons, a touch screen, a microphone, a speaker(s), and/or the like and/or any other components for allowing input of information into the wireless communication device 2000 and/or allowing output of information from the wireless communication device 2000), a power supply (e.g., a battery and associated power circuitry), etc.

In some embodiments, a computer program including instructions which, when executed by at least one processor, causes the at least one processor to carry out the functionality of the wireless communication device 2000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 21:
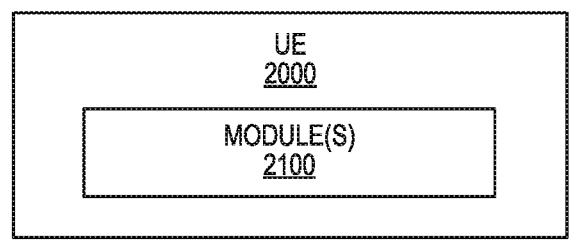
FIG. 21 is a schematic block diagram of the wireless communication device according to some other embodiments of the present disclosure.

FIG. 21 is a schematic block diagram of the wireless communication device 2000 according to some other embodiments of the present disclosure. The wireless communication device 2000 includes one or more modules 2100, each of which is implemented in software. The module(s) 2100 provide the functionality of the wireless communication device 2000 described herein.

Figure 22:
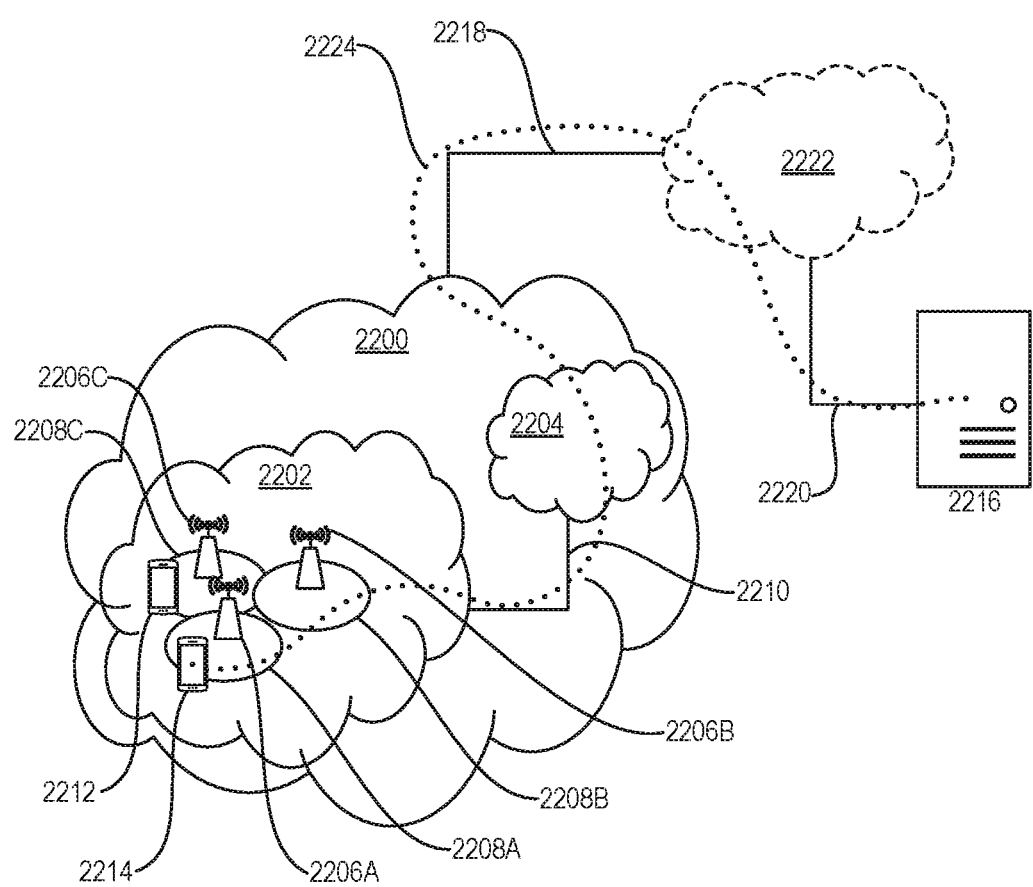
FIG. 22 is a schematic diagram of a communication system in accordance with an embodiment of the present disclosure.

With reference to FIG. 22, in accordance with an embodiment, a communication system includes a telecommunication network 2200, such as a 3GPP-type cellular network, which comprises an access network 2202, such as a RAN, and a core network 2204. The access network 2202 comprises a plurality of base stations 2206A, 2206B, 2206C, such as Node Bs, eNBs, gNBs, or other types of wireless Access Points (APs), each defining a corresponding coverage area 2208A, 2208B, 2208C. Each base station 2206A, 2206B, 2206C is connectable to the core network 2204 over a wired or wireless connection 2210. A first UE 2212 located in coverage area 2208C is configured to wirelessly connect to, or be paged by, the corresponding base station 2206C. A second UE 2214 in coverage area 2208A is wirelessly connectable to the corresponding base station 2206A. While a plurality of UEs 2212, 2214 are illustrated in this example, the disclosed embodiments are equally applicable to a situation where a sole UE is in the coverage area or where a sole UE is connecting to the corresponding base station 2206.

The telecommunication network 2200 is itself connected to a host computer 2216, which may be embodied in the hardware and/or software of a standalone server, a cloud-implemented server, a distributed server, or as processing resources in a server farm. The host computer 2216 may be under the ownership or control of a service provider, or may be operated by the service provider or on behalf of the service provider. Connections 2218 and 2220 between the telecommunication network 2200 and the host computer 2216 may extend directly from the core network 2204 to the host computer 2216 or may go via an optional intermediate network 2222. The intermediate network 2222 may be one of, or a combination of more than one of, a public, private, or hosted network; the intermediate network 2222, if any, may be a backbone network or the Internet; in particular, the intermediate network 2222 may comprise two or more sub-networks (not shown).

The communication system of FIG. 22 as a whole enables connectivity between the connected UEs 2212, 2214 and the host computer 2216. The connectivity may be described as an Over-the-Top (OTT) connection 2224. The host computer 2216 and the connected UEs 2212, 2214 are configured to communicate data and/or signaling via the OTT connection 2224, using the access network 2202, the core network 2204, any intermediate network 2222, and possible further infrastructure (not shown) as intermediaries. The OTT connection 2224 may be transparent in the sense that the participating communication devices through which the OTT connection 2224 passes are unaware of routing of uplink and downlink communications. For example, the base station 2206 may not or need not be informed about the past routing of an incoming downlink communication with data originating from the host computer 2216 to be forwarded (e.g., handed over) to a connected UE 2212. Similarly, the base station 2206 need not be aware of the future routing of an outgoing uplink communication originating from the UE 2212 towards the host computer 2216.

Example implementations, in accordance with an embodiment, of the UE, base station, and host computer discussed in the preceding paragraphs will now be described with reference to FIG. 23. In a communication system 2300, a host computer 2302 comprises hardware 2304 including a communication interface 2306 configured to set up and maintain a wired or wireless connection with an interface of a different communication device of the communication system 2300. The host computer 2302 further comprises processing circuitry 2308, which may have storage and/or processing capabilities. In particular, the processing circuitry 2308 may comprise one or more programmable processors, ASICs, FPGAs, or combinations of these (not shown) adapted to execute instructions. The host computer 2302 further comprises software 2310, which is stored in or accessible by the host computer 2302 and executable by the processing circuitry 2308. The software 2310 includes a host application 2312. The host application 2312 may be operable to provide a service to a remote user, such as a UE 2314 connecting via an OTT connection 2316 terminating at the UE 2314 and the host computer 2302. In providing the service to the remote user, the host application 2312 may provide user data which is transmitted using the OTT connection 2316.

The communication system 2300 further includes a base station 2318 provided in a telecommunication system and comprising hardware 2320 enabling it to communicate with the host computer 2302 and with the UE 2314. The hardware 2320 may include a communication interface 2322 for setting up and maintaining a wired or wireless connection with an interface of a different communication device of the communication system 2300, as well as a radio interface 2324 for setting up and maintaining at least a wireless connection 2326 with the UE 2314 located in a coverage area (not shown in FIG. 23) served by the base station 2318. The communication interface 2322 may be configured to facilitate a connection 2328 to the host computer 2302. The connection 2328 may be direct or it may pass through a core network (not shown in FIG. 23) of the telecommunication system and/or through one or more intermediate networks outside the telecommunication system. In the embodiment shown, the hardware 2320 of the base station 2318 further includes processing circuitry 2330, which may comprise one or more programmable processors, ASICs, FPGAs, or combinations of these (not shown) adapted to execute instructions. The base station 2318 further has software 2332 stored internally or accessible via an external connection.

The communication system 2300 further includes the UE 2314 already referred to. The UE's 2314 hardware 2334 may include a radio interface 2336 configured to set up and maintain a wireless connection 2326 with a base station serving a coverage area in which the UE 2314 is currently located. The hardware 2334 of the UE 2314 further includes processing circuitry 2338, which may comprise one or more programmable processors, ASICs, FPGAs, or combinations of these (not shown) adapted to execute instructions. The UE 2314 further comprises software 2340, which is stored in or accessible by the UE 2314 and executable by the processing circuitry 2338. The software 2340 includes a client application 2342. The client application 2342 may be operable to provide a service to a human or non-human user via the UE 2314, with the support of the host computer 2302. In the host computer 2302, the executing host application 2312 may communicate with the executing client application 2342 via the OTT connection 2316 terminating at the UE 2314 and the host computer 2302. In providing the service to the user, the client application 2342 may receive request data from the host application 2312 and provide user data in response to the request data. The OTT connection 2316 may transfer both the request data and the user data. The client application 2342 may interact with the user to generate the user data that it provides.

Figure 23:
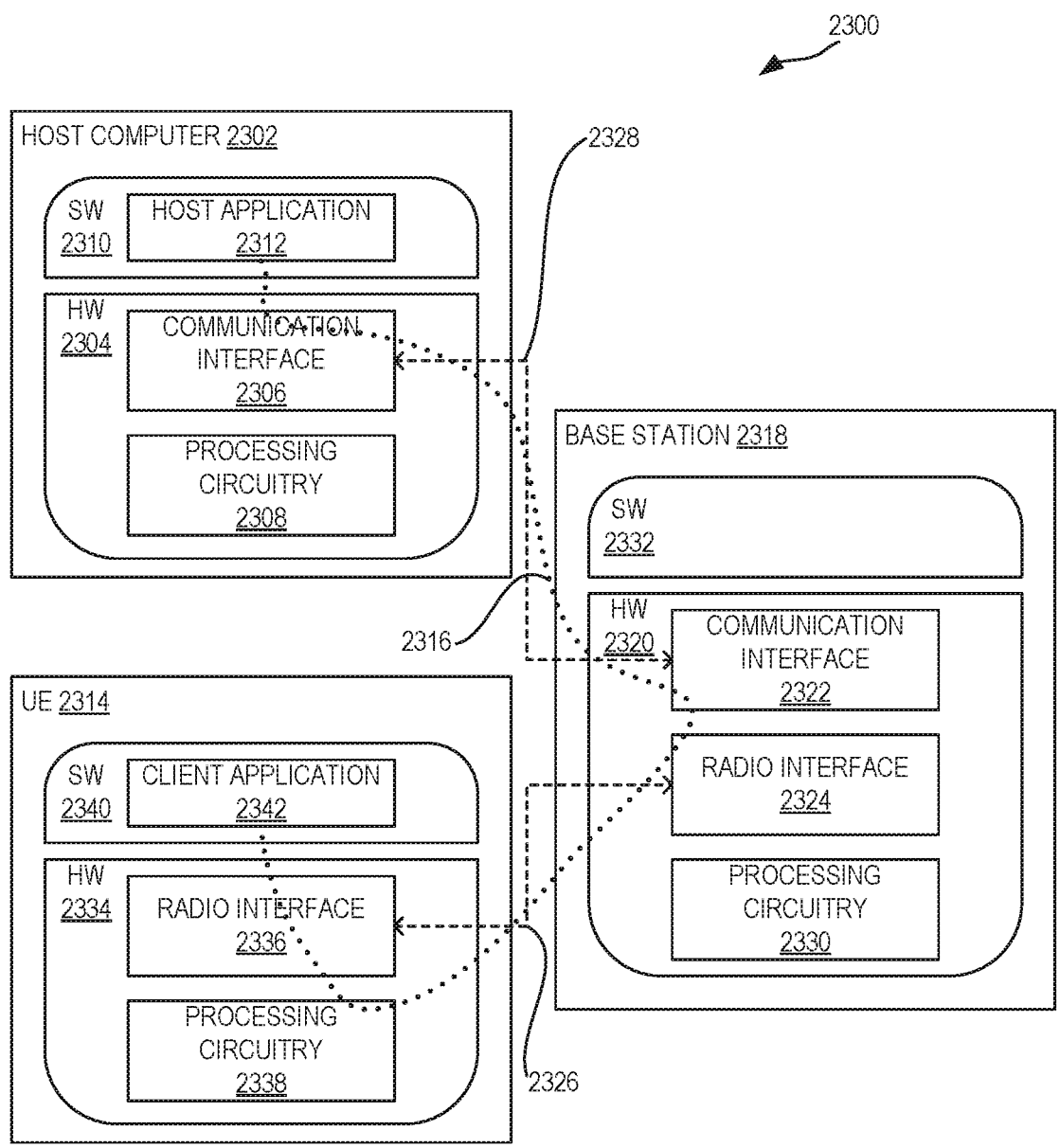
FIG. 23 is a schematic diagram of the UE, base station, and host computer in accordance with an embodiment of the present disclosure.

It is noted that the host computer 2302, the base station 2318, and the UE 2314 illustrated in FIG. 23 may be similar or identical to the host computer 2216, one of the base stations 2206A, 2206B, 2206C, and one of the UEs 2212, 2214 of FIG. 22, respectively. This is to say, the inner workings of these entities may be as shown in FIG. 23 and independently, the surrounding network topology may be that of FIG. 22.

In FIG. 23, the OTT connection 2316 has been drawn abstractly to illustrate the communication between the host computer 2302 and the UE 2314 via the base station 2318 without explicit reference to any intermediary devices and the precise routing of messages via these devices. The network infrastructure may determine the routing, which may be configured to hide from the UE 2314 or from the service provider operating the host computer 2302, or both. While the OTT connection 2316 is active, the network infrastructure may further take decisions by which it dynamically changes the routing (e.g., on the basis of load balancing consideration or reconfiguration of the network).

The wireless connection 2326 between the UE 2314 and the base station 2318 is in accordance with the teachings of the embodiments described throughout this disclosure. One or more of the various embodiments improve the performance of OTT services provided to the UE 2314 using the OTT connection 2316, in which the wireless connection 2326 forms the last segment. More precisely, the teachings of these embodiments may improve signaling overhead for indicating TCI state to a wireless device for receiving aperiodic CSI-RS and thereby provide benefits such as improved throughput.

A measurement procedure may be provided for the purpose of monitoring data rate, latency, and other factors on which the one or more embodiments improve. There may further be an optional network functionality for reconfiguring the OTT connection 2316 between the host computer 2302 and the UE 2314, in response to variations in the measurement results. The measurement procedure and/or the network functionality for reconfiguring the OTT connection 2316 may be implemented in the software 2310 and the hardware 2304 of the host computer 2302 or in the software 2340 and the hardware 2334 of the UE 2314, or both. In some embodiments, sensors (not shown) may be deployed in or in association with communication devices through which the OTT connection 2316 passes; the sensors may participate in the measurement procedure by supplying values of the monitored quantities exemplified above, or supplying values of other physical quantities from which the software 2310, 2340 may compute or estimate the monitored quantities. The reconfiguring of the OTT connection 2316 may include message format, retransmission settings, preferred routing, etc.; the reconfiguring need not affect the base station 2318, and it may be unknown or imperceptible to the base station 2318. Such procedures and functionalities may be known and practiced in the art. In certain embodiments, measurements may involve proprietary UE signaling facilitating the host computer 2302's measurements of throughput, propagation times, latency, and the like. The measurements may be implemented in that the software 2310 and 2340 causes messages to be transmitted, in particular empty or 'dummy' messages, using the OTT connection 2316 while it monitors propagation times, errors, etc.

FIG. 24 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 24 will be included in this section. In step 2400, the host computer provides user data. In sub-step 2402 (which may be optional) of step 2400, the host computer provides the user data by executing a host application. In step 2404, the host computer initiates a transmission carrying the user data to the UE. In step 2406 (which may be optional), the base station transmits to the UE the user data which was carried in the transmission that the host computer initiated, in accordance with the teachings of the embodiments described throughout this disclosure. In step 2208 (which may also be optional), the UE executes a client application associated with the host application executed by the host computer.

FIG. 25 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 25 will be included in this section. In step 2500 of the method, the host computer provides user data. In an optional sub-step (not shown) the host computer provides the user data by executing a host application. In step 2502, the host computer initiates a transmission carrying the user data to the UE. The transmission may pass via the base station, in accordance with the teachings of the embodiments described throughout this disclosure. In step 2504 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some exemplary embodiments of the present disclosure are as follows.

Embodiment 1: A method performed by a wireless device for determining a Transmission Configuration Indication, TCI, state for receiving aperiodic Channel State Information Reference Signals, CSI-RS, is provided. The method includes one or more of: receiving (900) a higher layer (e.g., RRC) configuration parameter(s) indicating a first option or a second option for determining a TCI state or a Quasi Co-Located, QCL, assumption for receiving aperiodic CSI-RS. In the first option, the TCI state or the QCL assumption for receiving the aperiodic CSI-RS is identical to a TCI state or an QCL assumption activated for a scheduling Control Resource Set, CORESET. In the second option, the TCI state or the QCL assumption for receiving the aperiodic CSI-RS is identical to a TCI state or an QCL assumption indicated in an uplink related Downlink Control Information, DCI, (e.g., DCI format 0_1 or 0_2) that triggers the aperiodic CSI-RS. The method also includes determining (902) the TCI state or the QCL assumption based on the first option or the second option. The method also includes receiving (904) the aperiodic CSI-RS based on the determined TCI state or the QCL assumption.

Embodiment 2: in the first option, receiving (904) the aperiodic CSI-RS comprises receiving (904-1) the aperiodic CSI-RS with the QCL assumption in an activated TCI state of the scheduling CORESET if a scheduling offset between a last symbol of a Physical Downlink Control Channel, PDCCH, carrying a triggering DCI and a first symbol of the aperiodic CSI-RS is greater than or equal to a threshold (e.g., beamSwitchTiming) reported by the wireless device.

Embodiment 3: the higher layer configuration parameter(s) comprises a followControlResourceSetT-CIState configured in a CSI-AssociatedReportConfigInfo #1, and a followControlResourceSetTCIState not configured in a CSI-AssociatedReportConfigInfo #2.

Embodiment 4: the received aperiodic CSI-RS includes CSI-RS #1 received with a QCL assumption in TCI state #1 activated for CORESET #1 if the DCI received in CORESET #1 triggers a CSI-AperiodicTriggerState corresponding to AssociatedReportConfigInfo #1 or CSI-RS #2 received with a QCL assumption using a TCI state(s) provided by qcl-info parameter in CSI-AssociatedReortConfigInfo #2 if the DCI triggers the CSI-AperiodicTriggerState corresponding to AssociatedReportConfigInfo #2.

Embodiment 5: the higher layer configuration parameter(s) comprises a followControlResourceSetT-CIState configured per CSI-AperiodicTriggerState, per NZP-CSI-RS-Resource information element (TS 38.331), per NZP-CSI-RS-ResourceSet information element (TS 38.331), per CSI-ResourceConfig information element (TS 38.331), or per ControlResourceSet information element (TS 38.331).

Embodiment 6: the first option can be enabled/disabled per Non-Zero Power, NZP, CSI-RS resource in an NZP CSI-RS resource set.

Embodiment 7: in the second option, receiving (904) the aperiodic CSI-RS comprises receiving (904-2) the aperiodic CSI-RS with the QCL assumption indicated in the uplink related DCI that triggers the CSI-RS if a scheduling offset between a last symbol of a Physical Downlink Control Channel, PDCCH, carrying a triggering DCI and a first symbol of the aperiodic CSI-RS is greater than or equal to a threshold (e.g., beamSwitchTiming) reported by the wireless device.

Embodiment 8: the higher layer configuration parameter(s) comprises a followTciInDCI parameter in CSI-AssociatedReportConfigInfo.

Embodiment 9: the higher layer configuration parameter(s) comprises a followTciInDCI parameter configured per CSI-AperiodicTriggerState, per NZP-CSI-RS-Resource information element (TS 38.331), per NZP-CSI-RS-ResourceSet information element (TS 38.331), per CSI-ResourceConfig information element (TS 38.331), or per ControlResourceSet information element (TS 38.331).

Embodiment 10: the higher layer configuration parameter(s) can be explicit or implicit.

Embodiment 11: the second option can be enabled/disabled per Non-Zero Power, NZP, CSI-RS resource in an NZP CSI-RS resource set.

Embodiment 12: receiving (900) the higher layer configuration parameter(s) comprises receiving (900-1) a common higher layer configuration parameter(s) for indicating the first option or the second option.

Embodiment 13: receiving (904) the aperiodic CSI-RS comprises receiving (904-3) a first aperiodic CSI-RS from a first Transmission-Reception Point, TRP, (represented by a first TCI state) and a second aperiodic CSI-RS from a second TRP (represented by a second TCI state).

Embodiment 14: in the first option, determining (D) the TCI state or the QCL assumption comprises determining (902-1) the TCI state or the QCL assumption for the first aperiodic CSI-RS according to the first TCI state activated for a scheduling CORESET and for the second aperiodic CSI-RS according to the second TCI state activated for the scheduling CORESET.

Embodiment 15: in the second option, determining (902) the TCI state or the QCL assumption comprises determining (902-2) the TCI state or the QCL assumption for the first aperiodic CSI-RS according to the first TCI state indicated by a single codepoint in an uplink related DCI and for the second aperiodic CSI-RS according to the second TCI state indicated by the single codepoint in the uplink related DCI.

Embodiment 16: A method performed by a base station for indicating a Transmission Configuration Indication, TCI, state for receiving aperiodic Channel State Information Reference Signals, CSI-RS, is provided. The method comprising one or more of transmitting (1000), to a wireless device, a higher layer (e.g., RRC) configuration parameter(s) indicating a first option or a second option for determining a TCI state or a Quasi Co-Located, QCL, assumption for receiving aperiodic CSI-RS. In the first option, the TCI state or the QCL assumption for receiving the aperiodic CSI-RS is identical to a TCI state or an QCL assumption activated for a scheduling Control Resource Set, CORESET. In the second option, the TCI state or the QCL assumption for receiving the aperiodic CSI-RS is identical to a TCI state or an QCL assumption indicated in an uplink related Downlink Control Information, DCI, (e.g., DCI format 0_1 or 0_2) that triggers the CSI-RS. The method also includes transmitting (1002) the aperiodic CSI-RS based on the TCI state or the QCL assumption indicated via the first option or the second option.

Embodiment 17: A wireless device for determining a Transmission Configuration Indication, TCI, state for receiving aperiodic Channel State Information Reference Signals, CSI-RS. The wireless device includes processing circuitry configured to perform any of the steps of any of the embodiments performed by the wireless device and power supply circuitry configured to supply power to the wireless device.

Embodiment 18: A base station for indicating a Transmission Configuration Indication, TCI, state for receiving aperiodic Channel State Information Reference Signals, CSI-RS. The base station includes processing circuitry configured to perform any of the steps of any of the embodiments performed by the base station and power supply circuitry configured to supply power to the base station.

Embodiment 19: A User Equipment, UE, for determining a Transmission Configuration Indication, TCI, state for receiving aperiodic Channel State Information Reference Signals, CSI-RS. The UE includes an antenna configured to send and receive wireless signals. The UE also includes radio front-end circuitry connected to the antenna and to processing circuitry and configured to condition signals communicated between the antenna and the processing circuitry. The processing circuitry being configured to perform any of the steps of any of the embodiments performed by the wireless device. The UE also includes an input interface connected to the processing circuitry and configured to allow input of information into the UE to be processed by the processing circuitry, an output interface connected to the processing circuitry and configured to output information from the UE that has been processed by the processing circuitry, and a battery connected to the processing circuitry and configured to supply power to the UE.

Embodiment 20: A communication system including a host computer comprising processing circuitry configured to provide user data and a communication interface configured to forward the user data to a cellular network for transmission to a User Equipment, UE. The cellular network comprises a base station having a radio interface and processing circuitry, the base station's processing circuitry configured to perform any of the steps of any of the embodiments performed by the base station.

Embodiment 21: the communication system further including the base station.

Embodiment 22: the communication system further including the UE, wherein the UE is configured to communicate with the base station.

Embodiment 23: the processing circuitry of the host computer is configured to execute a host application, thereby providing the user data and the UE comprises processing circuitry configured to execute a client application associated with the host application.

Embodiment 24: A method implemented in a communication system including a host computer, a base station, and a User Equipment, UE. The method includes at the host computer, providing user data. The method also includes at the host computer, initiating a transmission carrying the user data to the UE via a cellular network comprising the base station, wherein the base station performs any of the steps of any of the embodiments performed by the base station.

Embodiment 25: the method also includes at the base station, transmitting the user data.

Embodiment 26: the user data is provided at the host computer by executing a host application, the method further comprising, at the UE, executing a client application associated with the host application.

Embodiment 27: A User Equipment, UE, configured to communicate with a base station, the UE comprising a radio interface and processing circuitry configured to perform the method of the previous 3 embodiments.

Embodiment 28: A communication system including a host computer comprising processing circuitry configured to provide user data and a communication interface configured to forward user data to a cellular network for transmission to a User Equipment, UE. The UE comprises a radio interface and processing circuitry, the UE's components configured to perform any of the steps of any of the embodiments performed by the wireless device.

Embodiment 29: the cellular network further includes a base station configured to communicate with the UE.

Embodiment 30: the processing circuitry of the host computer is configured to execute a host application, thereby providing the user data and the UE's processing circuitry is configured to execute a client application associated with the host application.

Embodiment 31: A method implemented in a communication system including a host computer, a base station, and a User Equipment, UE. The method includes at the host computer, providing user data and at the host computer, initiating a transmission carrying the user data to the UE via a cellular network comprising the base station, wherein the UE performs any of the steps of any of the embodiments performed by the wireless device.

Embodiment 32: the method also includes at the UE, receiving the user data from the base station.

Embodiment 33: A communication system including a host computer comprising communication interface configured to receive user data originating from a transmission from a User Equipment, UE, to a base station. The UE comprises a radio interface and processing circuitry, the UE's processing circuitry configured to perform any of the steps of any of the embodiments performed by the wireless device.

Embodiment 34: the communication system further including the UE.

Embodiment 35: the communication system, further including the base station, wherein the base station comprises a radio interface configured to communicate with the UE and a communication interface configured to forward to the host computer the user data carried by a transmission from the UE to the base station.

Embodiment 36: the processing circuitry of the host computer is configured to execute a host application and the UE's processing circuitry is configured to execute a client application associated with the host application, thereby providing the user data.

Embodiment 37: the processing circuitry of the host computer is configured to execute a host application, thereby providing request data and the UE's processing circuitry is configured to execute a client application associated with the host application, thereby providing the user data in response to the request data.

Embodiment 38: A method implemented in a communication system including a host computer, a base station, and a User Equipment, UE. The method includes at the host computer, receiving user data transmitted to the base station from the UE, wherein the UE performs any of the steps of any of the embodiments performed by the wireless device.

Embodiment 39: the method also includes at the UE, providing the user data to the base station.

Embodiment 40: the method also includes at the UE, executing a client application, thereby providing the user data to be transmitted and at the host computer, executing a host application associated with the client application.

Embodiment 41: the method also includes at the UE, executing a client application and at the UE, receiving input data to the client application, the input data being provided at the host computer by executing a host application associated with the client application. The user data to be transmitted is provided by the client application in response to the input data.

Embodiment 42: A communication system including a host computer comprising a communication interface configured to receive user data originating from a transmission from a User Equipment, UE, to a base station. The base station comprises a radio interface and processing circuitry, the base station's processing circuitry configured to perform any of the steps of any of the embodiments performed by the base station.

Embodiment 43: the communication system further including the base station.

Embodiment 44: the communication system further including the UE, wherein the UE is configured to communicate with the base station.

Embodiment 45: the processing circuitry of the host computer is configured to execute a host application and the UE is configured to execute a client application associated with the host application, thereby providing the user data to be received by the host computer.

Embodiment 46: A method implemented in a communication system including a host computer, a base station, and a User Equipment, UE. The method includes at the host computer, receiving, from the base station, user data originating from a transmission which the base station has received from the UE, wherein the UE performs any of the steps of any of the embodiments performed by the wireless device.

Embodiment 47: the method also includes at the base station, receiving the user data from the UE.

Embodiment 48: the method also includes at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BWP Bandwidth Part
CG Configured Grants
CORESET Control Resource Set
CP Cyclic Prefix
CPU Central Processing Unit
CQI Channel Quality Indicator
CSI-RS Channel State Information-Reference Signal
DCI Downlink Control Information
DFT Discrete Fourier Transform
DL Downlink
DM-RS Demodulation Reference Signals
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MIMO Multiple-Input-Multiple-Output
MME Mobility Management Entity
MTC Machine Type Communication
NC-JT Non-Coherent Joint Transmission
NEF Network Exposure Function
NF Network Function
NR New Radio
NRF Network Function Repository Function
NSSF Network Slice Selection Function
NZP Non-Zero Power
OFDM Orthogonal Frequency Division Multiplexing
OTT Over-the-Top
PC Personal Computer
PCF Policy Control Function
PDCCH Physical Downlink Control Channel
PDSCH Physical Downlink Shared Channel
P-GW Packet Data Network Gateway
PMI Precoding Matrix Indicator
PUSCH Physical Uplink Shared Channel
QCL Quasi Co-Located
QoS Quality of Service
RAM Random Access Memory
RAN Radio Access Network
RB Resource Block
RE Resource Element
RI Rank Indicator
ROM Read Only Memory
RRC Radio Resource Control
RRH Remote Radio Head
RTT Round Trip Time
SCEF Service Capability Exposure Function
SINR Signal to Interference and Noise Ratio
SMF Session Management Function
SSB Synchronization Signal Block
TB Transport Blocks
TCI Transmission Configuration Indication
TRP Transmission-Reception Points
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for receiving aperiodic Channel State Information Reference Signals, CSI-RS, the method comprising:
  receiving a configuration for receiving the aperiodic CSI-RS and a downlink message in a Control Resource Set, CORESET, wherein the downlink message schedules a transmission of the aperiodic CSI-RS;
  determining a Quasi Co-Location, QCL, relationship between the aperiodic CSI-RS and one or more Downlink Reference Signals, DL RSs, based on the received configuration and one of the received downlink message and the CORESET; and
  receiving the aperiodic CSI-RS based on the QCL relationship between the aperiodic CSI-RS and the one or more DL RSs;
  wherein the received configuration indicates: an indicator indicating that the QCL relationship is described by a Transmission Configuration Indication, TCI, state activated for the CORESET; and wherein:
    determining the QCL relationship comprises determining a first QCL relationship for receiving a first aperiodic CSI-RS according to a first TCI state activated for a first CORESET and a second QCL relationship for receiving a second aperiodic CSI-RS according to a second TCI state activated for a second CORESET, wherein the downlink message scheduling the first aperiodic CSI-RS and the second aperiodic CSI-RS is received in both the first CORESET and the second CORESET; and
    receiving the aperiodic CSI-RS comprises receiving the first aperiodic CSI-RS according to the first QCL relationship and the second aperiodic CSI-RS according to the second QCL relationship.

2. The method of claim 1, wherein the downlink message is contained in a Downlink Control Information, DCI, carried in a Physical Downlink Control Channel, PDCCH.

3. The method of claim 1, wherein the QCL relationship is related to one or more QCL types each comprising one or more of following QCL parameters:
Doppler shift;
Doppler spread;
Average delay;
Delay spread; and
Spatial filter parameter.

4. The method of claim 1, wherein receiving the aperiodic CSI-RS comprises receiving the aperiodic CSI-RS based on QCL parameters of the one or more DL RSs.

5. The method of claim 1, wherein receiving the aperiodic CSI-RS comprises receiving the aperiodic CSI-RS based on the QCL relationship in response to a scheduling offset being greater than or equal to a threshold.

6. The methods of claim 5, wherein the scheduling offset corresponds to an offset between a last symbol of the PDCCH and a first symbol of the aperiodic CSI-RS.

7. The method of claim 1, wherein the TCI state comprises one or more QCL types each comprising a respective one of the one or more DL RSs.

8. The method of claim 1, wherein receiving the configuration comprises receiving a Radio Resource Control, RRC, parameter.

9. The method of claim 1, wherein receiving the configuration comprises receiving a Channel State Information, CSI, aperiodic trigger state and is only applicable for aperiodic CSI-RS associated to the aperiodic trigger state.

10. The method of claim 1, wherein receiving the configuration comprises receiving a followControlResourceSetTCIState parameter configured per one of the following:
CSI-AperiodicTriggerState;
NZP-CSI-RS-Resource information element;
NZP-CSI-RS-ResourceSet information element;
per CSI-ResourceConfig information element; and
ControlResourceSet information element.

11. The method of claim 1, wherein the first CORESET is identical to or different from the second CORESET.

12. The method of claim 1, wherein indicating that the QCL relationship is described by a TCI state activated for the CORESET can be enabled or disabled per a Non-Zero Power, NZP, CSI-RS resource in an NZP CSI-RS resource set.

13. A wireless device comprising processing circuitry configured to cause the wireless device to:
receive a configuration for receiving the aperiodic CSI-RS and a downlink message in a Control Resource Set, CORESET, wherein the downlink message schedules a transmission of the aperiodic CSI-RS;
determine a Quasi Co-Location, QCL, relationship between the aperiodic CSI-RS and one or more Downlink Reference Signals, DL RSs, based on the received configuration and one of the received downlink message and the CORESET; and
receive the aperiodic CSI-RS based on the QCL relationship between the aperiodic CSI-RS and the one or more DL RSs;
wherein the received configuration indicates: an indicator indicating that the QCL relationship is described by a Transmission Configuration Indication, TCI, state activated for the CORESET; and wherein:
determining the QCL relationship comprises determining a first QCL relationship for receiving a first aperiodic CSI-RS according to a first TCI state activated for a first CORESET and a second QCL relationship for receiving a second aperiodic CSI-RS according to a second TCI state activated for a second CORESET, wherein the downlink message scheduling the first aperiodic CSI-RS and the second aperiodic CSI-RS is received in both the first CORESET and the second CORESET; and
receiving the aperiodic CSI-RS comprises receiving the first aperiodic CSI-RS according to the first QCL relationship and the second aperiodic CSI-RS according to the second QCL relationship.

14. A method performed by a base station for transmitting aperiodic Channel State Information Reference Signals, CSI-RS, the method comprising:
transmitting a configuration for receiving the aperiodic CSI-RS and a downlink message in a Control Resource Set, CORESET, wherein the downlink message schedules a transmission of the aperiodic CSI-RS; and
transmitting the aperiodic CSI-RS based on the configuration and one of the downlink message and the CORESET;
wherein the transmitted configuration indicates: an indicator indicating that the QCL relationship is described by a Transmission Configuration Indication, TCI, state activated for the CORESET; and
wherein transmitting the aperiodic CSI-RS comprises transmitting the first aperiodic CSI-RS according to the first QCL relationship and the second aperiodic CSI-RS according to the second QCL relationship; and
wherein the first QCL relationship is for transmitting a first aperiodic CSI-RS according to a first TCI state activated for a first CORESET and the second QCL relationship is for receiving a second aperiodic CSI-RS according to a second TCI state activated for a second CORESET are determined, wherein the downlink message scheduling the first aperiodic CSI-RS and the second aperiodic CSI-RS is transmitted in both the first CORESET and the second CORESET.

15. A base station comprising processing circuitry configured to cause the base station to:
transmit a configuration for receiving the aperiodic CSI-RS and a downlink message in a Control Resource Set, CORESET, wherein the downlink message schedules a transmission of the aperiodic CSI-RS; and
transmit the aperiodic CSI-RS based on the configuration and one of the downlink message and the CORESET;
wherein the transmitted configuration indicates: an indicator indicating that the QCL relationship is described by a Transmission Configuration Indication, TCI, state activated for the CORESET; and
wherein transmitting the aperiodic CSI-RS comprises transmitting the first aperiodic CSI-RS according to the first QCL relationship and the second aperiodic CSI-RS according to the second QCL relationship; and
wherein the first QCL relationship is for transmitting a first aperiodic CSI-RS according to a first TCI state activated for a first CORESET and the second QCL relationship is for receiving a second aperiodic CSI-RS according to a second TCI state activated for a second CORESET are determined, wherein the downlink message scheduling the first aperiodic CSI-RS and the second aperiodic CSI-RS is transmitted in both the first CORESET and the second CORESET.

\* \* \* \* \*